United States Patent Office 3,658,836
Patented Apr. 25, 1972

3,658,836
HYDROXYBOROXIN-AMINE SALTS
Billy Dale Vineyard, St. Louis, Mo., assignor to
Monsanto Company, St. Louis, Mo.
No Drawing. Filed Apr. 16, 1964, Ser. No. 360,411
Int. Cl. C07d 49/34
U.S. Cl. 260—309.7      6 Claims

ABSTRACT OF THE DISCLOSURE

This invention relates to hydroxyboroxin-amine salts which are prepared by reacting boric acid with an amine as described hereinafter. The compounds are useful inter alia as fungicides and additives for lubricating oils.

---

This invention relates to new hydroxyboroxin-amine salts which can be represented by the structure

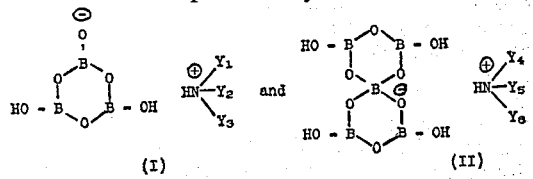

where $Y_1$ is selected from hydrogen, alkyl, cycloalkyl and aralkyl and $Y_2$ and $Y_3$ are hydrogen, except that $Y_1$, $Y_2$ and $Y_3$ can, together with the nitrogen atom, form a group having a quinuclidine-type structure, that is, a quinuclidine compound, pyridine or a picoline; and $Y_4$, $Y_5$ and $Y_6$ are each selected from hydrogen, alkyl, cycloalkyl and aralkyl, except that when $Y_4$ is hydrogen $Y_5$ and $Y_6$ can, together with the nitrogen atom, form a heterocyclic ring selected from (i) 6-membered carbon- and nitrogen-containing rings, (ii) 6-membered carbon-nitrogen- and oxygen-containing rings and (iii) 5-membered rings selected from pyrrolidine, pyrroline, imidazole and thiazolidine, and further excepted that $Y_4$, $Y_5$ and $Y_6$ can, together with the nitrogen atom, form a group having a quinuclidine-type structure, that is, a quinuclidine compound.

In preparing the compounds of this invention, boric acid is reacted with a suitable amine, that is, an amine which will form a hydroxyboroxin-amine salt as described above, by heating a mixture of boric acid and amine at temperatures of the order of 25°–100° C. However, steric requirements of the amine and mol ratio of reactants dictates which product is formed as more fully explained below.

Thus, the compounds represented by (I) which are monoammonium salts of 1,3,5-trihydroxyboroxin (metaboric acid), can be formed by reacting an amine $Y_1NH_2$ and boric acid in a mol ratio of three or less mols of boric acid per mol of amine. In the case of the compounds containing a quinuclidine group, or pyridine or a picoline, the mol ratio of boric acid to amine, as with the primary amines, $Y_1NH_2$, is three or less to one, respectively.

The compounds represented by (II), which are monoammonium salts of spiro[(3,5-dihydroxyboroxin) - 1,1'- (3',5' - dihydroxyboroxin)], but which can also be described as monoammonium pentaborates, can be formed (1) from primary amines, $Y_4NH_2$, and amines having a quinuclidine structure, by reacting boric acid with such amines in mol ratios of three to five mols of boric acid per mol of amine; (2) from secondary amines, $Y_4Y_5NH$, and the heterocyclic secondary amines, and tertiary amines, $Y_4Y_5Y_6N$, provided such amines have a dissociation constant greater than about $1 \times 10^{-7}$, by reacting such amines with boric acid. When using such secondary and tertiary amines, the spiro compounds form regardless of the mol ratio of boric acid to amine and therefore if a mol ratio of less than 5:1, respectively, is used unreacted amine will remain.

Conveniently the preparation of the above-described salts is conducted using a reaction medium which may form a homogeneous or heterogeneous reaction mass. Suitable reaction media are aromatic hydrocarbons such as benzene, toluene and xylene, alone or with water. Also an excess of the amine reactant will suffice as a reaction medium. The use of benzene is preferred since its use allows removal of water by azeotropic distillation at a relatively low temperature after completing the reaction.

Typical materials which can be used to form the salts of this invention are the mono-, di- and trialkyl amines in which each alkyl group has from 1 to 20 carbons, such as methylamine, ethylamine, n-propylamine, isopropylamine, n-butylamine, isobutylamine, sec-butylamine, amylamine, n-heptylamine, n-hexylamine, 1,1,3,3-tetramethylbutylamine, n-octylamine, 2-ethylhexylamine, isooctylamine, nonylamine, 2,2,4,4-tetramethylpentylamine, n-decylamine, isodecylamine, dodecylamine, 1,1,3,3,5,5-hexamethylhexylamine, tridecylamine, pentadecylamine, stearylamine, and the like; dimethylamine, diethylamine, methylethylamine, diisopropylamine, di-n-butylamine, diisoamylamine, dioctylamine, didecylamine, methyldecylamine, distearylamine and the like; and trimethylamine, triethylamine, methyldiethylamine, tri-n-propylamine, dimethylbutylamine, methyl-di-tert.-butylamine, tri-n-hexylamine, tri-2-ethylhexylamine, n-propyldioctylamine, trilaurylamine, dimethyldodecylamine, dimethylstearylamine, tristearylamine and the like. There can also be used cycloalkyl amines of 3 to 10 carbon atoms, such as cyclopropylamine, cyclohexylamine, dicyclohexylamine, methylcyclohexylamine, tricyclohexylamine, cyclooctylamine and cyclodecylamine. Also alkylenediamines such as ethylenediamine, propylenediamine, trimethylenediamine, tetramethylenediamine, hexamethylenediamine and the like can be used. Furthermore aralkyl amines can be used such as amines containing only aralkyl groups such as benzylamines, phenethylamine, dibenzylamine and tribenzylamine, but there can also be used mixed alkylaralkyl amines such as methylbenzylamine, dibenzylmethylamine, methylpropylbenzylamine, decylbenzylamine, stearylbenzylamine and the like.

The heterocyclic secondary amines which can be used to form the monoammonium pentaborates (II) are, for example, piperidine, piperazine, pyrrolidine, the oxazines (such as morpholine and 1,4-isoxazine), pyrroline, imidazole, and thiazolidine, and their alkyl-substituted derivatives such as 2-methylpyrrolidine, and the like.

The tertiary amines having a quinuclidine-type structure suitable for preparing the compounds of this invention include, in addition to quinuclidine itself, triethylenediamine, and alkyl-substituted derivatives thereof, such as 3 - methylquinuclidine, 4-ethylquinuclidine, 5-methyltriethylenediamine, N-ethyltriethylenediamine and the like. Tertiary amines such as pyridine and the picolines can also be used.

The preparation of typical examples of the salts described above are given below in which parts are parts by weight unless otherwise stated.

EXAMPLE 1

Triethylenediamine (16.8 parts—0.15 mol) in 50 ml. of benzene was added to a slurry of 18.6 parts of boric acid (0.3 mol), 10 ml. of water, and 150 ml. of benzene. The mixture was then stirred for 5 minutes at room temperature. A sample of the reaction mixture was removed; the solid removed by filtration, washed with diethyl ether and dried. The remaining reaction mixture was refluxed (70–80° C.) until theory water (15–16 ml.) had been removed. The benzene insoluble product was then collected on a filter, washed with diethyl ether and dried. Infrared spectrum and elemental analysis of the final product was identical to the product obtained from the sample removed after 5 minutes. The product, obtained in 98% yield, was the monotriethylenediamine salt of 1,3,5-trihydroxyboroxin. Analysis of this product showed the presence of 13.02% boron and 11.20% nitrogen.

EXAMPLE 2 n-Octylamine (25.8 parts—0.2 mol) was added rapidly to a mixture of 12.4 parts of boric acid (0.2 mol), 7 ml. of water and 100 ml. of benzene. The mixture was then refluxed (70–80° C.) until theory water (10.6 ml.) was removed by azeotropic distillation. The solid product, the mono-n-octylammonium salt of 1,3,5-trihydroxyboroxin, was filtered from the cooled reaction mixture, washed with diethyl ether and dried. The yield was 90%. The infrared spectrum showed bands at 714 cm.$^{-1}$ and 1640 cm.$^{-1}$ (boroxin ring and amine salt, respectively). Analysis of the product showed the presence of 12.26% boron and 5.25% nitrogen.

EXAMPLE 3

Four parts of 1,3,5-trihydroxyboroxin (metaboric acid) (0.031 mol) was added to 11.4 parts of n-octylamine (0.088 mol). The mixture was stirred at 40–60° C. for 40 minutes, and then at 80° C. for 20 minutes. Diethyl ether (50 ml.) was added to the thick mass, and the insoluble solid isolated by filtration. The prdouct was obtained in essentially quantitative yield. Infrared and elemental analyses as well as X-ray powder diffraction showed that this material was identical to the boric acid—n-octylamine reaction product obtained in Example 2. Analysis of the product showed the presence of 12.50% boron and 5.68% nitrogen.

EXAMPLE 4 n-Propylamine (11.8 parts—0.2 mol) was added to a slurry of 12.4 parts of boric acid (0.2 mol), 10 ml. of water, and 100 ml. of benzene. The mixture was stirred at 25–30° C. for 30 minutes. Theory water (13.6 ml.) was removed by azeotropic distillation and the benzene insoluble product collected on a filter. The product was the mono-n-propylammonium salt of 1,3,5-trihydroxyboroxin. The product analyzed 16.8% boron and 7.54% nitrogen.

EXAMPLE 5

14.4 parts of n-propylamine (0.238 mol) was added to 4 parts of freshly prepared 1,3,5-trihydroxyboroxin (0.035 mol). A twenty degree temperature increase was noted. The resulting solution was then stirred at 40–50° C. for 1.5 hours. Diethyl ether (60 ml.) was added to the cooled solution and the precipitated product isolated by filtration. The product was obtained in essentially quantitative yield. Conductance, X-ray powder diffraction, and elemental analyses indicated that this material was identical to the boric acid-n-propylamine reaction product obtained in Example 4.

EXAMPLE 6

In the manner of Example 4, 7.3 parts of tert.-butyl-amine and 6.2 parts of boric acid were reacted to provide, in quantitative yield, the mono-tert.-butylammonium salts of 1,3,5-trihydroxyboroxin which analyzed 16.0% boron and 6.68% nitrogen.

EXAMPLE 7

Boric acid (18.6 parts—0.3 mol) was added to 90 parts of pyridine and the mixture was stirred at 25–30° C. for one hour. The mixture was then filtered (4 parts of product recovered) after which excess pyridine was stripped (70° C. at 40 mm. Hg) to provide 15 additional parts of solid product which was combined with the 4 parts obtained previously. The product, the monopyridinium salt of 1,3,5-trihydroxyboroxin, analyzed 16.0% boron and 6.27% nitrogen.

In the manner of the foregoing examples additional monoammonium salts of 1,3,5-trihydroxyboroxin, meeting the above definition, can be prepared. Examples of such salts are the following:

monomethylammonium salt of 1,3,5-trihydroxyboroxin
monoethylammonium salt of 1,3,5-trihydroxyboroxin
mono-n-butylammonium salt of 1,3,5-trihydroxyboroxin
mono-n-pentylammonium salt of 1,3,5-trihydroxyboroxin
mono-n-hexylammonium salt of 1,3,5-trihydroxyboroxin
mono-n-decylammonium salt of 1,3,5-trihydroxyboroxin
monododecylammonium salt of 1,3,5-trihydroxyboroxin
monotridecylammonium salt of 1,3,5-trihydroxyboroxin
monopentadecylammonium salt of 1,3,5-trihydroxyboroxin
monostearylammonium salt of 1,3,5-trihydroxyboroxin
mono-α-picolinium salt of 1,3,5-trihydroxyboroxin
monothiazolidinium salt of 1,3,5-trihydroxyboroxin
monoquinuclidinium salt of 1,3,5-trihydroxyboroxin
monobenzylammonium salt of 1,3,5-trihydroxyboroxin
monophenethylammonium salt of 1,3,5-trihydroxyboroxin The preparation of monoammonium salt of spiro[(3,5-dihydroxyboroxin)-1,1'-(3',5'-dihydroxyboroxin)] (II) is illustrated in the following examples.

EXAMPLE 8 n-Octylamine (10.3 parts, 0.08 mol) was added to a slurry of 24.8 parts (0.4 mol) of boric acid, 15 ml. of water and 100 ml. of benzene. The mixture was stirred at 25–30° C. for 0.5 hour and then heated to reflux (70–80° C.). Water (22 ml.) was removed by azeotropic distillation. Acetonitrile (50 ml.) was then added and the white solid, mono n-octylammonium salt of spiro-[(3,5-dihydroxyboroxin)-1,1'-(3',5' - dihydroxyboroxin)] collected on a filter. The yield was quantitative. The infrared spectrum of the product showed bands at 700 cm.$^{-1}$ and 1630 cm.$^{-1}$ (boroxin ring and the amine salt) respectively. This salt contained 15.3% boron and 4.06% nitrogen.

EXAMPLE 9 n-Propylamine (4.7 parts, 0.08 mol) was added rapidly to a mixture of 24.8 parts (0.4 mol) of boric acid, 15 ml. of water and 100 ml. of benzene. The mixture was stirred at 50° C. for 40 minutes. Approximately 13 ml. of water was removed by azeotropic distillation. Acetonitrile (70 ml.) was then added to the cooled mixture and the mono n-propylammonium salt of spiro[(3,5-dihydroxyboroxin)-1,1'-(3',5' - dihydroxyboroxin)] collected on a filter in a yield of 97%. The infrared spectrum showed bands at 709 cm.$^{-1}$ and 1640 cm.$^{-1}$ (boroxin ring and amine salt, respectively). This salt contained 19.5% boron and 5.28% nitrogen.

EXAMPLE 10

According to the procedure followed in Example 8, the mono di-n-butylammonium salt of spiro[(3,5-dihydroxyboroxin)-1,1'-(3',5'-dihydroxyboroxin)] was prepared. The infrared spectrum showed bands at 716 cm.$^{-1}$, 1600 cm.$^{-1}$, and 3300–3400 cm.$^{-1}$ (boroxin, amine salt, and hydroxy groups, respectively). This salt contained 15.0% boron and 3.60% nitrogen.

EXAMPLE 11

This example shows the formation of a salt of this invention by displacement of the amine portion of a salt with a more basic amine.

A solution of 1.5 parts (0.0054 mol) of the mono trimethylammonium salt of spiro[(3,5-dihydroxyboroxin)-1,1'-(3',5'-dihydroxyboroxin)] and 2.0 parts (0.023 mol) of piperidine in 30 ml. of water was stirred for 2 hours at room temperature and 200 mm. Hg vacuum. Benzene (100 ml.) was added and 80–90% of the water removed by azeotropic distillation. Acetonitrile (50 ml.) was then added and the remaining water removed. The solvent was decanted and the residual product isolated and dried to give a quantitative yield of desired product. Infrared and acid titration confirmed that the product was the mono piperidinium salt of spiro[(3,5-dihydroxyboroxin)-1,1'-(3',5'-dihydroxyboroxin)], which was found to contain 17.8% boron and 4.50% nitrogen.

The preparation of other spiro salts of this invention is summarized in Table I below. All yields were 98–100%.

TABLE I

| Ex. No. | Amine | Product | Percent boron Calc. | Found | Percent nitrogen Calc. | Found |
|---|---|---|---|---|---|---|
| 12 | Isopropylamine | Mono isopropylammonium salt of spiro [(3,5-dihydroxyboroxin)-1,1'-(3',5'-dihydroxyboroxin)]. | 19.5 | 20.1 | 5.04 | 5.2 |
| 13 | tert.-Butylamine | Mono tert.-butylammonium salt of spiro [(3,5-dihydroxyboroxin)-1,1'-(3',5'-dihydroxyboroxin)]. | 18.5 | 17.7 | 4.80 | 5.40 |
| 14 | Dimethylamine | Mono dimethylammonium salt of spiro [(3,5-dihydroxyboroxin)-1,1'-(3',5'-dihydroxyboroxin)]. | 20.5 | 20.1 | 5.30 | 5.30 |
| 15 | Diethylamine | Mono diethylammonium salt of spiro [(3,5-dihydroxyboroxin)-1,1'-(3',5'-dihydroxyboroxin)]. | 18.5 | 18.5 | 4.80 | 4.89 |
| 16 | Dibutylamine | Mono dibutylammonium salt of spiro [(3,5-dihydroxyboroxin)-1,1'-(3',5'-dihydroxyboroxin)]. | 15.5 | 15.2 | 4.02 | 3.80 |
| 17 | Trimethylamine | Mono trimethylammonium salt of spiro [(3,5-dihydroxyboroxin)-1,1'-(3',5'-dihydroxyboroxin)]. | 19.5 | 19.0 | 5.04 | 4.93 |
| 18 | Triethylamine | Mono triethylammonium salt of spiro [(3,5-dihydroxyboroxin)-1,1'-(3',5'-dihydroxyboroxin)]. | 16.9 | 16.8 | 4.38 | 4.59 |
| 19 | N,N'-dimethylethylenediamine | Mono N,N'-dimethylethylenediamine salt of spiro [(3,5-dihydroxyboroxin)-1,1'-(3',5'-dihydroxyboroxin)]. | 17.6 | 17.7 | 91.0 | 9.00 |

The following two examples illustrate the preparation of spiro hydroxyboroxin-amine salts (II) from hydroxyboroxin-amine salts (I).

EXAMPLE 20

A solution of 1.9 parts of the mono-n-propylammonium salt of 1,3,5-trihydroxyboroxin (0.01 mol) as prepared in Example 4 and 1.23 parts of boric acid (0.02 mol) in 10 ml. of water was stirred at 40–50° C. for 1 hour. Benzene (75 ml.) was added and the water removed by azeotropic distillation. When approximatey 80% of the water was removed, acetonitrile (50 ml.) was added and the remaining water distilled. The product was isoated in essentially quantitative yield.

Infrared and elemental analyses, X-ray powder diffraction, and base number showed that this product was identical to the boric acid-n-propylamine reaction product obtained in Example 9.

EXAMPLE 21

A solution of 4.04 parts of the mono-n-octylammonium salt of 1,3,5-trihydroxyboroxin (0.015 mol) as prepared in Example 2 and 1.86 parts of boric acid (0.03 mol) in 35 ml. of water was stirred at 40–50° C. for 0.5 hour. Benzene (100 ml.) was then added and the water removed by azeotropic distillation. After approximately 90% of the water had been removed, the distillation was stopped because solid was caking the side of the flask. Acetonitrile (50 ml.) was added to the stirred mixture. The solid product (5.3 parts) was collected on a filter. The infra-red spectrum, equivalent conductance, and elemental analysis of the product were identical to those of the boric acid-n-octylamine reaction product obtained in Example 8.

The compounds represented by (I) and (II) are thermally stable. The monoammonium pentaborates (II) are useful as fungicides against *Pythium ultimum* and both compounds (I) and (II) can be used as flame retardant coatings for paper and paper products. When used as a flame retardant, these compounds can be applied from aqueous solution usually just preceding the final drying operation. The monoammonium salts of 1,3,5-trihydroxyboroxin (I) are also useful, as is evident from the above examples, in preparing the monoammonium pentaborates (II).

The fungicidal utility of the monoammonium pentaborates is readily demonstrated by a screening test, the procedure for which is as follows:

Screening of chemicals as soil fungicides is against the pathogen *Pythium ultimum* incorporated in sterile soil which is placed in 1 ounce cups. The chemicals to be tested are drenched at 30 p.p.m. (on a soil weight basis) over the surface of the soil in the cups. The treated soil is incubated for 56–60 hours at 65–70° F. in a 100 percent relative humidity chamber.

The fungicidal activity of the test compound is based on the degree of mycelial growth inhibition on the surface of the soil. The amount of mycelial growth on the surface of the soil is rated 1 through 5 as follows: 1=no growth, 2=growth from corn meal only, 3=some growth in soil away from corn meal particles, 4=surface covered, but little aerial growth, 5=surface covered, much aerial growth, (growth equivalent to that on untreated soil).

Utilizing the above-described procedure the spiro hydroxyboroxin-amine salts previously described were found to possess good fungicidal activity. Representative results are given in Table II below.

TABLE II

Test Compound: Compound of Example— Rating
8 _____ 2
9 _____ 2
12 _____ 2
14 _____ 1
18 _____ 2

In addition to the foregoing, it has been found that not only do relatively simple amines, as discussed above, form the spiro hydroxyboroxin-amine salts (monoammonium pentaborates) but also that certain complex amines or simple amines containing complex substituents will also react with boric acid to form spiro hydroxyboroxin-amine salts. In more complex amines whose structure may not be precisely known, the presence of a reactable nitrogen atom can be determined by titration of such amines with perchloric acid.

Thus, it has been found that a large group of complex nitrogen-containing compounds, which are useful in lubricating oil compositions as non-metallic or ashless detergents or dispersants, can be improved with regard to their usefulness in such compositions, by reacting them with boric acid to form monoammonium salts of spiro-[(3,5 - dihydroxyboroxin)-1,1'-(3',5'-dihydroxyboroxin)]. These salts, in addition to retaining the function of said complex nitrogen-containing compounds as detergents, also impart antirust protection and provide improved bearing protection (anti-corrosion protection) in lubricating oil compositions. Also these spiro hydroxyboroxin-amine salts have better detergent qualities than do the nitrogen-containing compounds from which they are prepared when incorporated into lubricating oils used in high temperature applications such as in diesel engines especially where high sulfur content fuels are used. These spiro salts can also be used in burner fuels and gasolines wherein they function as detergents and rust preventives.

The new salts referred to above can be represented by the structure

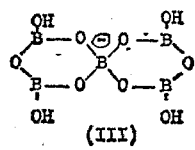

where Q can be
(a) An imidazolidine, represented by the structure

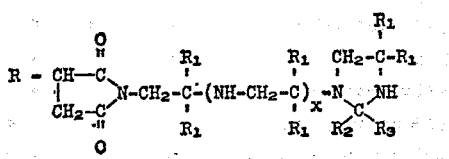

(b) A bis-imidazolidine, represented by the structure

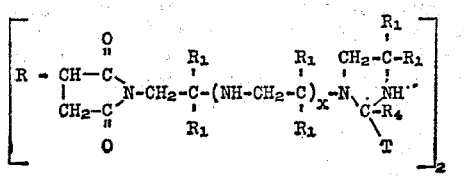

(c) An alkenylsuccinimide, represented by the structure

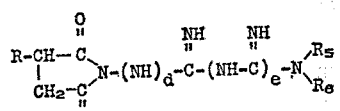

(d) A bis(alkenylsuccinimide), represented by the structure

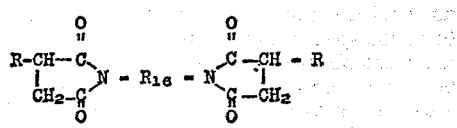

(e) An N,N'-azaalkylene-bis(alkenylsuccinimide), represented by the structure

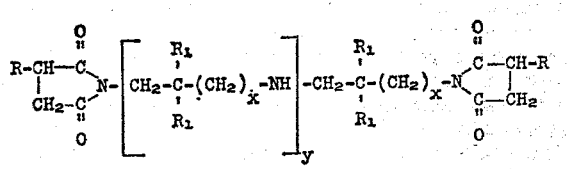

(f) A 3,5-dialkyl-4-hydroxybenzylamine, represented by the structure

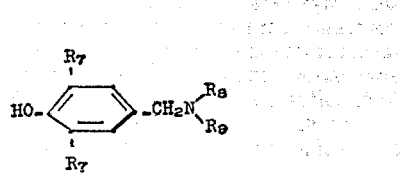

(g) A monoalkenylsuccinimide of an N-alkylpiperazine, represented by the structure

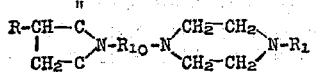

(h) An N-dialkylaminoalkyl monoalkenyl succinimide, represented by the structure

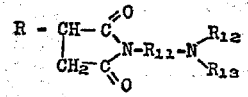

(i) A Schiff base represented by the structure

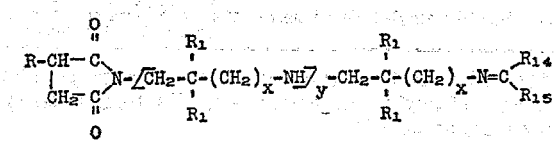

(j) An imine represented by the structure

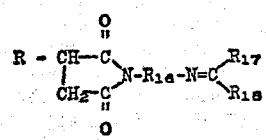

(k) A 2-substituted imidazolidine represented by the structure

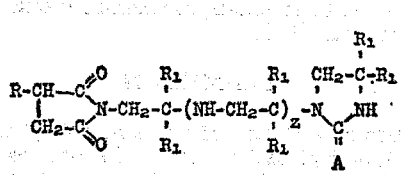

(l) An imidazoline represented by the structure

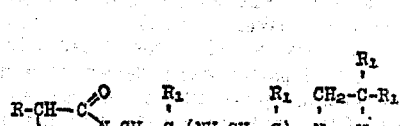

and
(m) A bis-imidazoline represented by the structure

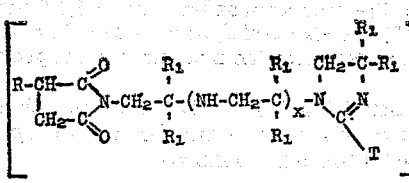

In the foregoing and hereinafter the various representative letters have the following meanings:

R is a polyalkenyl radical having a molecular weight of from about 700 to about 2500, preferably about 900 to about 1500;

$R_1$ is hydrogen or alkyl of 1 to 3 carbon atoms;

$R_2$ and $R_3$ are hydrogen, alkyl, alkenyl or haloalkyl of 1 to 20 carbon atoms;

$R_4$ is hydrogen or alkyl of 1 to 20 carbon atoms;

$R_5$ is alkyl or cycloalkyl;

$R_6$ is hydrogen, alkyl or cycloalkyl of 1 to 20 carbon atoms;

$R_7$ is a secondary or tertiary alkyl of 3 to 12 carbon atoms;

$R_8$ is alkyl of 1 to 12 carbons, cycloalkyl of 5 to 6 carbons, aralkyl of 7 to 11 carbons, aryl of 6 to 10 carbons, alkaryl of 7 to 15 carbons or

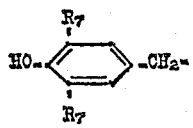

$R_9$ is hydrogen, alkyl of 1 to 12 carbons, cycloalkyl of 5 to 6 carbons, aralkyl of 7 to 11 carbons, aryl of 6 to 10 carbons or alkaryl of 7 to 15 carbons, $R_{10}$ is alkylene radical containing from 1 to 3 carbon atoms;

$R_{11}$ is an alkylene radical of 1 to 4 carbon atoms;

$R_{12}$ and $R_{13}$ are each alkyl of 1 to 10 carbons;

$R_{14}$ is hydrogen, alkyl of 1 to 20 carbon atoms, a thienyl, a phenyl, a naphthyl or a furyl radical;

$R_{15}$ is a thienyl, a phenyl, a naphthyl or a furyl radical;

$R_{16}$ is selected from

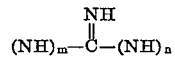

$m$ is 0 or 1, $n$ is 0 or 1, and the sum of $m+n$ is 1 to 2 and

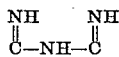

$R_{17}$ and $R_{18}$ are each hydrogen, an alkyl, alkenyl or haloalkyl of 1 to 20 carbon atoms, a thienyl, a phenyl, a naphthyl or a furyl radical or together can form a carbocyclic ring of 5 to 10 carbon atoms;

$R_{19}$ is hydrogen, an alkyl, substituted alkyl, cycloalkyl, alkenyl, substituted alkenyl, aryl, substituted aryl of 1 to 20 carbon atoms or heterocyclic radical of 5 to 6 atoms;

A is oxygen, sulfur or NH;

T is alkylene of 1 to 20 and alkenylene of 2 to 20 carbon atoms;

$d$ and $e$ are each whole numbers from 0 to 1 but the sum of $d+e$ is from 0 to 1;

$x$ is a whole number from 0 to 3;

$y$ is a whole number from 1 to 4; and $z$ is a whole number from 0 to 3 except that when A is oxygen or sulfur $z$ cannot be 0.

The aforedescribed spiro hydroxyboroxin-amine salts (III) can be prepared from the various complex nitrogen-containing compounds (a) through (m) by the reaction thereof with boric acid using five mols of boric acid per mol of such complex. The use of lesser amounts of boric acid merely results in forming a mixture of the compounds of the invention and intermediate nitrogen-containing product. However, such mixtures are also useful as detergent additives in lubricating oils and are therefore contemplated herein.

The imidazolidine and bis-imidazolidine derived salts can be prepared by forming (a) or (b) by reacting (i) an alkylenylsuccinic anhyride, represented by the structure

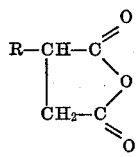

or the acid thereof, (ii) a polyethyleneamine, represented by the structure

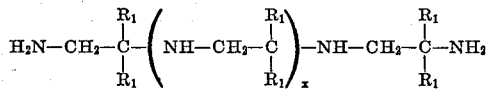

and (iii) a carbonyl-containing compound, that is, (1) an aldehyde or ketone represented by the structure

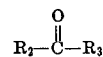

or (2) a dialdehyde or diketone represented by the structure

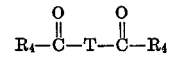

where R, $R_1$, $R_2$, $R_3$, $R_4$, $x$ and T have their aforedescribed significance and then reacting the thus prepared imidazolidine or bis-imidazolidine with boric acid. The mol ratios of (i):(ii):(iii) used will be about 1:1:1, respectively, to prepare monoimidazolidines and about 2:2:1, respectively, to prepare bis-imidazolidines. In this preparation (ii) and (iii) are reacted to prepare an intermediate imidazolidine which is then reacted with (i), or (i) can be first reacted with (ii) followed by reaction with (iii). To provide a reaction medium an inert solvent can be used, e.g., a hydrocarbon such as toluene, xylene, cyclohexane or mineral oil. Suitable temperatures for the reaction of anhydride, polyethyleneamine and carbonyl-containing compound at atmospheric pressure are of the order of 100°–175° C. and vacuum can be used in the case of a mineral oil reaction medium to operate at about the same temperatures. The reaction involving boric acid can be effected merely by mixing the reactants at temperatures of the order of 25°–150° C. Preferably a temperature of about 60°–110° C. is used, since such temperatures provide good reaction rates.

The alkenylsuccinic anhydrides useful in preparing the imidazolidines and bis-imidazolidines can be prepared from an olefin or olefin polymer and maleic anhydride. Preferably a polymer of a lower olefin, or copolymer of lower olefins, is used, for example, polymers of ethylene, propylene, butylene, isobutylene and mixtures thereof. Since the reaction between the olefin and maleic anhydride may not go to completion, the resulting alkenylsuccinic anhydride can contain some unreacted olefin which can be allowed to remain as a diluent with no harmful effects upon the performance of the compounds of this invention.

The polyethyleneamines useful in preparing the imidazolidines are available commercially, but can also be prepared from alkylene dichlorides and ammonia; representative examples are diethylenetriamine, 2,5-dimethyl-3-aza-pentamethylene-1,5-diamine, 2,5-diethyl-3-aza-pentamethylene-1,5-diamine, 2,2,5,5-tetramethyl-3-aza-pentamethylene - 1,5 - diamine, triethylenetetramine, 2,5,8 - trimethyl-3,6-diaza-octamethylene - 1,8 - diamine, tetraethylenepentamine, pentaethylenehexamine, and the like.

In the case of the carobonyl- and dicarbonyl-containing compounds useful in preparing the imidazolidines and bis-imidazolidines of this invention, the following are representative.

Mono-carbonyl containing:

(a) Aldehydes: formaldehyde, acetaldehyde, propionaldehyde, n-butyraldehyde, isobutyraldehyde, n-valeraldehyde, isovaleraldehyde, pivaldehyde, α-methylbutyraldehyde, caproaldehyde, 3,3 - dimethylbutyraldehyde, heptaldehyde, pelagonaldehyde, nonanal, 2-ethylhexanal, caprylaldehyde, lauraldehyde, tridecanal, myristaldehyde, pentadecanal, palmitaldedhyde, heptadecanal, stearaldehyde, brassaldehyde and the like; substituted aldehydes such as chloroacetaldehyde, chloral, butylchloral, trifluoroacetaldehyde, aldol, and the like; and unsaturated aldehydes, such as acrolein, methacrolein, crotonaldehyde, 3-butenal, 3- and 4-pentenal, 3-, 4- and 5-hexenal, 4-octenal, 2-ethyl-3-hexenal, 3-decenal, and the like.

(b) Ketones: acetone, methyl ethyl ketone, methyl propyl ketone, methyl isopropyl ketone, methyl butyl ketone, methyl isobutyl ketone, methyl sec-butyl ketone, methyl tert-butyl ketone, methyl cyclobutyl ketone, methyl neopentyl ketone, methyl tert-amyl ketone, methyl n-amyl ketone, methyl hexyl ketone, methyl cyclohexyl ketone, methyl n-heptyl ketone, methyl n-octyl ketone, methyl nonyl ketone, methyl decyl ketone, diethyl ketone, di-n-propyl ketone, ethyl isopropyl ketone, ethyl n-propyl ketone, ethyl tert-butyl ketone, ethyl n-butyl ketone, n-propyl isopropyl ketone, n-propyl tert-butyl ketone, 3- and 4-methyl-2-hexanone, 3,4-dimethyl-2-pentanone, 3-ethyl-2-pentanone, 2-decanone, 2- and 3-methyl-1-penten-4-one, 1-hepten-4-one, 3-methyl-1- hexen-5-one, 5-methyl-5-hexen-2-one, and the like.

Di-carbonyl containing:

(a) Aldehydes: glyoxal, malonaldehyde, succinaldehyde, glutaraldehyde, adipaldehyde, pimelaldehyde, suberaldehyde, azelaldehyde, sebacaldehyde, brassylaldehyde, rocellaldehyde, and the like.

(b) Ketones: diacetyl, acetylacetone, acetonylacetone, 2,3-hexanedione, 2,4-heptanedione, 3-methyl-2,4-hexanedione, 2,5-hexanedione, 2,3-octanedione, and the like.

The preparation of illustrative salts within the above definition is given in the following non-limiting examples wherein parts are parts by weight.

EXAMPLE 22

Into a conventional reactor fitted with an agitator, raw material inlet, product outlet, reflux condenser, Dean-Stark trap, heating means and thermometer, there was charged 240 parts (0.159 mol) of N-(3,6,9,12-tetraazadodecyl)polybutenylsuccinimide (prepared from tetraethylene pentamine and polybutenylsuccinic anhydride in which the polybutenyl group had an average molecular weight of 980) and about 80 ml. toluene. With the agitator running 11.5 grams of n-butyraldehyde (0.159 mol) was then slowly charged and the resulting mixture heated at reflux for about two hours while removing water formed by the reaction by azeotropic distillation.

After cooling the reaction mixture from above, 49.2 parts of boric acid (0.795 mol), were charged, after which the resulting mixture was heated at 70°–80° C. for 15–30 minutes and then heated at reflux for about two hours while removing water formed by the reaction. Thereafter the reaction mass is filtered. The filtrate was distilled to remove the solvent leaving 275 parts of the 1-[8-(polybutenylsuccinimido) - 3,6 - diazaoctyl]-2-propylimidazolidine monoammonium salt of spiro[(3,5 - dihydroxyboroxin)-1,1'-(3',5'-dihydroxyboroxin)] which analyzed 3.31% nitrogen and 2.77% boron.

Additional examples of other polyalkenylsuccinimidoazaalkylimidazoline monoammonium spiro hydroxyboroxin salts of this invention and the materials used for their preparation (other than boric acid) are given in Table III, below. In the table only the alkenyl, or polyalkenyl, portion of the polyalkenylsuccinic anhydride and the average molecular weight of such portion are given, DETA means diethylenetriamine and TEPA means tetraethylenepentamine. In each case five mols of boric acid are reacted per mol of amine.

TABLE III

| Ex. No. | Alkenyl portion of alkenylsuccinic anhydride (mol. wt. of alkenyl group) (a) | Polyethylene amine (b) | Carbonyl-containing compound (c) | Molar ratio (a):(b):(c) | Product |
|---|---|---|---|---|---|
| 23 | Polybutenyl (980) | TEPA | Formaldehyde | 1:1:1 | The 1-[8-(polybutenylsuccinimido-3,6-diazaoctyl]-imidazolidine monoammonium salt of spiro[(3,5-dihydroxyboroxin)-1,1'-(3',5'-dihydroxyboroxin)]. |
| 24 | do | TEPA | Acetaldehyde | 1:1:1 | The 1-[8-(polybutenylsuccinimido-2,6-diazaoctyl]-2-methylimidazolidine monoammonium salt of spiro-[(3,5-dihydroxyboroxin)-1,1'-(3',5'-dihydroxyboroxin)]. |
| 25 | do | TEPA | Isodecylaldehyde | 1:1:1 | The 1-[8-(polybutenylsuccinimido)-3,6-diazaoctyl]-2-nonylimidazolidine monoammonium salt of spiro-[(3,5-dihydroxyboroxin)-1,1'-(3',5'-dihydroxyboroxin)]. |
| 26 | Polybutenyl (1,350) | DETA | Glutaraldehyde | 2:2:1 | The trimethylene bis[1-(8-polybutenylsuccinimido)-3,6-diazoctyl)-imidazolidine] monoammonium salt of spiro[(3,5-dihydroxyboroxin)-1,1'-(3',5'-dihydroxyboroxin)]. |
| 27 | Polybutenyl (980) | TEPA | Acetone | 1:1:1 | The 1-[8-(polybutenylsuccinimido)-3,6-diazaoctyl]-2-dimethylimidazolidine monoammonium salt of spiro-[(3,5-dihydroxyboroxin)-1,1'-(3',5'-dihydroxyboroxin)]. |
| 28 | do | TEPA | Cyclohexanone | 1:1:1 | The 1-[8-(polybutenylsuccinimido)-3,6-diazaoctyl]-1,4-diazaspiro[4.5]decane monoammonium salt of spiro[(3,5-dihydroxyboroxin)-1,1'-(3',5'-dihydroxyboroxin)]. |
| 29 | do | DETA | Acetylacetone | 2:2:1 | The 2,2'-methylene bis[1-(8-polybutenylsuccinimido)-3,6-diazaoctyl)-imidazolidine] monoammonium salt of spiro[(3,5-dihydroxyboroxin)-1,1'-(3'5'-dihydroxyboroxin)]. |
| 30 | Polybutenyl (1,315) | DETA | Glutaraldehyde | 2:2:1 | The trimethylene bis[1-(2-(polybutenylsuccinimido)ethyl)-2-imidazolidine] monoammonium salt of spiro[(3,5-dihydroxyboroxin)-1,1'-(3',5'-dihydroxyboroxin)]. |
| 31 | do | TEPA | n-Butyraldehyde | 1:1:1 | The 1-[8-(polybutenylsuccinimido)-3,6-diazaoctyl]-2-propylimidazolidine monoammonium salt of spiro-[(3,5-dihydroxyboroxin)-1,1'-(3',5'-dihydroxyboroxin)]. |
| 32 | Polybutenyl (980) | DETA | do | 1:1:1 | The 1-[2-(polybutenylsuccinimido)ethyl]-2-propylimidazolidine monoammonium salt of spiro[(3,5-dihydroxyboroxin)-1,1'-(3',5'-dihydroxyboroxin)]. |

The alkenylsuccinimide (c) derived monoammonium salts of spiro[(3,5 - dihydroxyboroxin)-1,1'-(3',5'-dihydroxyboroxin)] can be prepared by heating an alkenylsuccinic anhydride as aforedescribed with an alkyl-substituted nitrogen derivative of carbonic acid (hereinafter described) followed by reaction with boric acid. The preparation of the alkenylsuccinimide can be conveniently carried out at temperatures in the range of about 75° C. to about 175° C., but at or above the dehydration temperature of the reaction system (that is, under dehydration or cyclization conditions) using substantially equal mols of each reactant, preferably while continuously removing, as by distillation, water formed by the reaction. For the reaction with boric acid the temperatures are those previously discussed, namely 25°–150° C. but preferably 60°–110° C.

It is preferred to conduct the preparation of the instant compounds in an inert solvent, since the products are usually very viscous and difficult to handle. Suitable solvents are hydrocarbons such as benzene, toluene, xylene, cyclohexane or mineral oil. A synthetic oil can also be used, e.g., the alkylene polymers, alkylene oxide polymers, olefin-chlorinated hydrocarbon polymers, dicarboxylic acid esters, alkylated benzenes, chlorinated biphenyl, silicate esters, silicon polymers and the like. No solvent is necessary, however.

The alkyl-substituted (which includes cyclic alkyl) nitrogen derivatives of carbonic acid useful in preparing the alkenylsuccinimides are mono- and dialkyl-substituted guanidine, aminoguanidine and biguanide. Such alkyl derivatives can be prepared by means known to the art, of which the following is illustrative. In each illustration, AC represents an organic acid.

Alkylguanidines

Alkylguanidines,

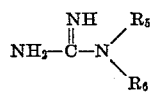

can be prepared from cyanimide and an amine,

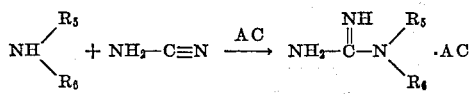

Alkylaminoguanidines

Alkylaminoguanidines,

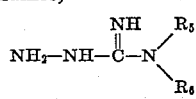

can be prepared by the reduction of alkylnitroguanidines,

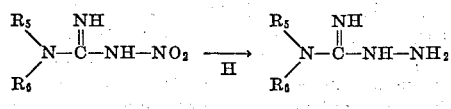

Alkylbiguanides

Alkylbiguanides,

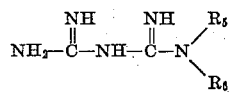

can be prepared from (1) guanidine and alkylcyanamide,

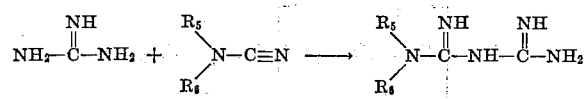

(2) cyanamide and an acid salt of an alkylguanidine,

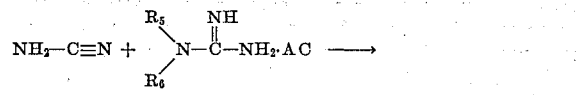

(3) biguanide and an amine salt,

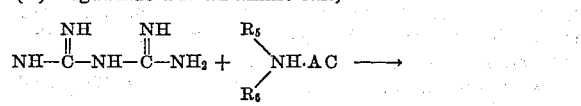

The basic salts of alkylguanidines and alkylbiguanides can also be reacted with the alkenylsuccinic anhydrides to prepare the alkenylsuccinimides used in making the pentaborate salts of this invention. Such basic salts are those of weak acids which, when dissolved in water, give a solution having a pH of at least about 7. Examples of such basic salts are the carbonate salts, bicarbonate salts, and aliphatic acid salts; e.g., alkylguanidine carbonate, alkylguanidine bicarbonate, alkylguanidine acetate, alkylguanidine propionate, alkylguanidine stearate, alkylbiguanide carbonate, alkylbiguanide acetate, alkylbiguanide octoate, alkylbiguanide stearate, and the like.

The preparation of typical alkenylsuccinimide monoammonium salts of spiro[(3,5-dihydroxyboroxin)-1,1'-(3', 5'-dihydroxyboroxin)] is illustrated in the following non-limiting examples wherein parts are parts by weight.

EXAMPLE 33

Into a suitable reaction vessel fitted with a Dean-Stark trap and conventional accessories containing 19.2 parts of cyclohexylamine and 30 cc. of water, there is slowly charged 12 parts of acetic acid. After completing addition of the acetic acid, there is charged an additional 2 parts of cyclohexylamine. The resulting mixture is then heated to about 90–95° C., and 16.8 parts of a 50% aqueous solution of cyanamide is slowly charged (approximately 2 hours). The reaction mixture is then heated at about 95° C. for about 30 minutes, 50 cc. of toluene was added, and the water was removed by azeotropic distillation. The cooled mixture was then filtered to give cyclohexylguanidine acetate.

Thereafter a mixture of 8.2 parts of cyclohexylguanidine acetate, 60 parts of polybutenylsuccinic anhydride (the average molecular weight of the polybutenyl group is about 900), and 50 cc. of toluene are heated for about 10 hours at about 130° C. while azeotropically removing water form in the reaction. The reaction mass is then cooled and 12.5 grams of boric acid are then charged and the reaction mass heated at reflux for one to two hours while azeotropically removing water as it is formed. The product is then filtered and the toluene stripped to yield the N - cyclohexyl-1-polybutenylsuccinimidoformamidine monoammonium salt of spiro[(3,5-dihydroxyboroxin)-1, 1',(3',5'-dihydroxyboroxin)].

EXAMPLE 34

Into a suitable reaction vessel, as described above, there is slowly charged, over about 3½ hours, a solution of 42 parts of cyanamide in 84 cc. of water to a solution of 76.7 parts of n-butylamine and 60 parts of acetic acid in 75 cc. of water at 95–100° C. Thereafter the resulting reaction mixture is heated for an additional ½ hour. After the reaction mass is cooled, ammonia is added in a quantity sufficient to make the reaction mass slightly alkaline. Carbon dioxide is then passed into and through the reaction mixture which is maintained at a temperature of 25–35° C., until all of the free n-butylguanidine prepared above is converted to n-butylguanidine bicarbonate, which precipitates during the $CO_2$ addition. The n-butylguanidine bicarbonate is then recovered by filtration and dried.

To the reaction vessel there is charged 17.4 parts of n-butylguanidine bicarbonate, 125 parts of polybutenylsuccinic anhydride (the average molecular weight of the polybutenyl group is about 1000) and 90 cc. of toluene. The reaction mixture is then heated in the range of about 140° C. to about 150° C. for about 12 hours, during which time carbon dioxide evolves and water of reaction is azeotropically removed. 28.9 parts of boric acid are then charged and the resulting mixture heated at reflux for one to two hours while removing water of reaction. The product is filtered and the toluene is then stripped to give the N-butyl-1-polybutenylsuccinimidoformamidine monoammonium salt of spiro[(3,5-dihydroxyboroxin)-1,1'-(3',5'-dihydroxyboroxin)].

Generally following the procedures of the foregoing examples, other similar salts can be prepared, examples of which are as listed below. The number in parentheses is the average molecular weight of the polyalkenyl group.

The N-(tert-dodecyl)-1-polybutenyl(1000)succinimidoformamidine monoammonium salt of spiro[(3,5-dihydroxyboroxin)-1,1'-(3',5'-dihydroxyboroxin)],
The N,N'(dicyclohexyl)-1-polybutenyl(700)succinimidoformamidine amonoammonium salt of spiro[(3,5-dihydroxyboroxin)-1,1'-(3',5'-dihydroxyboroxin)],
The N,N-(dibutyl)-1-polybutenyl(900)succinimidoformamidine monoammonium salt of spiro[(3,5-dihydroxyboroxin)-1,1'-(3',5'-dihydroxyboroxin)],
The N-(tert-butyl)-1-polypropenyl(1200)succinimidoformamidine monoammonium salt of spiro[(3,5-dihydroxyboroxin)-1,1'-(3',5'-dihydroxyboroxin)],
The 1-dodecyl-3-polybutenyl(1300)succinimidoguanidine monoammonium salt of spiro[(3,5-dihydroxyboroxin)-1,1'-(3',5'-dihydroxyboroxin)],
The 1-(3-butylguanidino)-1-polybutenyl(1000)succinimidomethyleneimine monoammonium salt of spiro[(3,5-dihydroxyboroxin)-1,1'-(3',5'-dihydroxyboroxin)],
The N-oleyl-1-polybutenyl(900)succinimidoformamidine monoammonium salt of spiro[(3,5-dihydroxyboroxin)-1,1'-(3',5'-dihydroxyboroxin)],
The 1-[N,N-(dibutyl)]-3-polybutenyl(1200)succinimidoguanidine monoammonium salt of spiro[(3,5-dihydroxyboroxin)-1,1'-(3',5'-dihydroxyboroxin)],
The 1-butyl-3-polybutenyl(900)succinimidoguanidine monoammonium salt of spiro[(3,5-dihydroxyboroxin)-1,1'-(3',5'-dihydroxyboroxin)],
The 1-stearyl-3-polybutenyl(700)succinimidoguanidine monoammonium salt of spiro[(3,5-dihydroxyboroxin)-1,1'-(3',5'-dihydroxyboroxin)],
The 1-[N,N-(diethyl)]-3-polybutenyl(900)succinimidoguanidine monoammonium salt of spiro[(3,5-dihydroxyboroxin)-1,1'-3',5'-dihydroxyboroxin)],
The 1-(3-dodecylguanidino)-1-polybutenyl(900)succinimidomethyleneimine monoammonium salt of spiro[(3,5-dihydroxyboroxin)-1,1'-(3',5'-dihydroxyboroxin)],
The 1-(3-oleylguanidino)-1-polybutenyl(700)succinimidomethyleneimine monoammonium salt of spiro[(3,5-dihydroxyboroxin)1,1'-(3',5'-dihydroxyboroxin)], and
The 1-(3,3-dibutylguanidino)-1-polybutenyl(900)succinimidomethyleneimine monoammonium salt of spiro[(3,5-dihydroxyboroxin)-1,1'-(3',5'-dihydroxyboroxin)].

The bis(alkenylsuccinimides) (d) used in preparing the spiro hydroxyboroxin-amine salts of this invention based thereon can be prepared by heating an alkenylsuccinic anhydride (as aforedescribed) and 1,3-diaminoguanidine, aminoguanidine or biguanide or their basic salts at temperatures in the range of about 75° C. to about 175° C., but at or above the dehydration or cyclization conditions, using a mol ratio of amine to alkenylsuccinic anhydride of about 0.5:1, respectively, preferably while continuously removing, as by distillation, water formed by the reaction. Basic salt has the same meaning as described above. It is preferred to conduct the reaction in a hydrocarbon solvent such as those previously described but the use of a solvent is not necessary. The resulting bis-imide is then reacted with boric acid under the same conditions described for the preparation of the salts based on alkenylsuccinimides.

The preparation of a typical bis-imide derived spiro hydroxyboroxin-amine salt is illustrated in the following non-limiting examples wherein parts are parts by weight.

EXAMPLE 35

Into a suitable reaction vessel, as previously described, there is charged 13.6 parts of aminoguanidine bicarbonate, 200 parts of polybutenylsuccinic anhydride (the average molecular weight of the polybutenyl group is about 1350) and 150 ml. of toluene. The resulting mixture is then heated at 140–150° C. for about 10–12 hours during which time carbon dioxide evolves and water of reaction is azeotropically distilled. The reaction mass is then cooled, 31.0 parts of boric acid is charged and the reaction mass heated at reflux for one to two hours while removing water of reaction by azeotropic distillation. The reaction mass is then filtered and the toluene stripped to provide the 1,N-bis(polybutenylsuccinimido)formamidine monoammonium salt of spiro[3,5 - dihydroxyboroxin)-1,1'-(3',5'-dihydroxyboroxin)].

EXAMPLE 36

In the manner of Example 35, 13.2 parts of biguanide bicarbonate, 200 parts of the same polybutenylsuccinic anhydride and 31.0 parts of boric acid are reacted to provide the bis[imino(polybutenylsuccinimido)methyl]amine monoammonium salt of spiro[(3,5 - dihydroxyboroxin)-1,1'-(3',5'-dihydroxyboroxin)].

Generally following the procedures of the foregoing examples, other boroxin salts based on the compounds of class (d) can be prepared, examples of which are as follows:

the 1,N - bis[polybutenyl(900)succinimido]formamidine monoammonium salt of spiro['3,5-dihydroxyboroxin)-1,1'-(3',5'-dihydroxyboroxin)],
the bis[imino(polybutenyl(1315)succinimido)methyl] amino monoammonium salt of spiro [(3,5-dihydroxyboroxin)-1,1'-(3',5'-dihydroxyboroxin)], and
the 1,3-bis[polybutenyl(1350)succinimido]guanidine monoammonium salt of spiro[(3,5-dihydroxyboroxin)-1,1'-(3',5'-dihydroxyboroxin)].

The spiro hydroxyboroxin-amine salts of this invention based upon the compounds of class (e) can be prepared by heating a toluene, or other hydrocarbon solution of an alkenylsuccinic anhydride (as aforedescribed) and an azaalkylenediamine at temperatures of about 100° C. to 175° C. using mol ratios of anhydride to amine of from about 2:1 to about 2.5:1, respectively, while continuously removing, as by distillation, the water formed from the reaction. Thereafter boric acid is added and the resulting mass heated at 25°–150° C. as previously described.

The azaalkylenediamines which are used can be represented by the structure

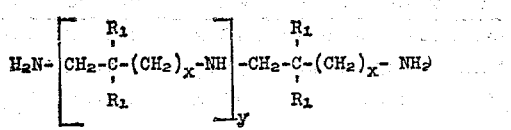

where $R_1$, $x$ and $y$ have their aforedescribed significance. The azaalkylenediamines are available commercially, but can also be prepared from alkylene dichlorides and ammonia. Examples of azaalkylenediamines useful in preparing the bis-imides are diethylenetriamine, dipropylenetriamine, di(trimethylene)triamine, di(1,2-butylene)triamine, 2,2,5,5 - tetramethyl-3-aza-pentamethylene-1,5-diamine, dipentamethylenetriamine, triethylenetetramine, tripropylenetetramine, tetraethylenepentamine, pentaethylenehexamine, and the like, and mixtures thereof.

The preparation of typical N,N'-azaalkylene-bis(alkenylsuccinimide) monoammonium salts of spiro[(3,5-dihydroxyboroxin) - 1,1' - (3',5'-dihydroxyboroxin)] is illustrated in the following nonlimiting examples wherein parts are parts by weight.

EXAMPLE 37

Seven hundred two parts of polybutenyl(935)succinic anhydride and 200 ml. of toluene are charged into a suitable vessel fitted with a Dean-Stark tube and other conventional accessories. After the resulting mixture is warmed to about 50° C., 47.6 parts of tetraethylenepentamine are slowly added over about 30 minutes. The mixture is then heated with agitation at temperatures in the range of about 120–140° C. for about 3 hours, during which time water of reaction is removed by azeotropic distillation. Seventy-eight parts of boric acid are then charged and the resulting mixture heated at reflux to azeotropically remove water of reaction. Thereafter the toluene is stripped to leave the N,N'-(3,6,9-triazaundecamethylene)-bis[polybutenyl(935)succinimide] monoammonium salt of spiro[(3,5-dihydroxyboroxin)-1,1'-(3',5'-dihydroxyboroxin)].

EXAMPLE 38

In the manner of Example 37, 1100 parts of polybutenyl(700)succinic anhydride and 300 ml. of toluene are charged into a suitable reaction vessel and the resulting mixture is warmed to about 50° C. 72.8 parts of tetraethylenepentamine are then added dropwise and the reaction mixture heated at reflux until the amount of water collected equals the theoretical. 119.3 parts of boric acid are then charged and the reaction mixture heated at reflux to azeotropically remove water of reaction. Thereafter the toluene is stripped to leave the N,N'-(3,6,9 - triazaundecamethylene)-bis[polybutenyl(700)succinimide] monoamonium salt of spiro[(3,5-dihydroxyboroxin)-1,1'-(3',5'-dihydroxyboroxin)].

EXAMPLE 39

In the manner of Example 37, the N,N'-(3,6,9-triazaundecamethylene)-bis[polybutenyl(1500)succinimide] monoammonium salt of spiro[(3,5-dihydroxyboroxin)-1,1'-(3',5'-dihydroxyboroxin)] is prepared from 220 parts of polybutenyl(1500)succinic anhydride, 6.5 parts of tetraethylenepentamine and 10.7 parts of boric acid.

EXAMPLE 40

Into a suitable reaction vessel, there is charged 43.3 parts of polybutenyl(1330)succinic anhydride, process oil and 1.8 parts of di(trimethylene)triamine. The resulting reaction mixture is then heated at about 150° C. and under vacuum until the amount of water collected is about equal to the theoretical. 4.3 parts of boric acid are then added and the reaction mass heated at 90° C. for about one hour, and then at about 150° C. and a pressure of 35 mm. Hg for one hour to yield the N,N'-(4-azaheptamethylene)bis[polybutenyl(1330)succinimide] monoammonium salt of spiro[(3,5-dihydroxyboroxin)-1,1'-(3',5'-dihydroxyboroxin)].

In a similar manner, other N,N-azaalkylene-bis(alkenylsuccinimide) monoammonium salts of spiro[(3,5-dihydroxyboroxin)-1,1'-(3',5'-dihydroxyboroxin)] can be prepared, such as:

the N,N'-(3,6,9-triazaundecamethylene)-bis[polyethenyl(1500)succinimide] monoammonium salt of spiro[3,5-dihydroxyboroxin)-1,1'-(3',5'-dihydroxyboroxin)], the N,N'-(3-azapentamethylene)-bis[polybutenyl(800)succinimide]monoammonium salt of spiro[(3,5-dihydroxyboroxin)-1,1'-(3',5'-dihydroxyboroxin)], the N,N'-(3-azapentamethylene)-bis[polypropenyl(850)succinimide]monoammonium salt of spiro[(3,5-dihydroxyboroxin)-1,1'-(3',5'-dihydroxyboroxin)], the N,N'-(3-azapentamethylene)-bis[polyethenyl(1000)succinimide]monoammonium salt of spiro[3,5-dihydroxyboroxin)-1,1'-(3',5'-dihydroxyboroxin)], the N,N'-(3,6-diazaoctamethylene)-bis[polypropenyl(1300)succinimide] monoammonium salt of spiro[(3,5-dihydroxyboroxin)-1,1'-(3',5'-dihydroxyboroxin)], the N,N'-(3,6-diazaoctamethylene-bis[polybutenyl(1800)succinimide] monoammonium salt of spiro[(3,5-dihydroxyboroxin)-1,1'-(3',5'-dihydroxyboroxin)], the N(N'-(3,6,9,12-tetraazatetradecamethylene)-bis[polyethenyl(1800)succinimide] monoammonium salt of spiro[(3,5 - dihydroxyboroxin) - 1,1'-(3',5'-dihydroxyboroxin)], the N,N'-(3,6,9,12-tetraazatetradecamethylene)-bis[polybutenyl(2000)succinimide] monoammonium salt of spiro[(3,5 - dihydroxyboroxin) - 1,1'-(3',5'-dihydroxyboroxin)], the N,N'-(3,6,9,12-tetraazatetradecamethylene)-bis[polypentenyl(2000)succinimide] monoammonium salt of spiro[(3,5 - dihydroxyboroxin) - 1,1'-(3',5'-dihydroxyboroxin)], the N,N'-(4-azaheptamethylene)-bis[polypropenyl(1500)succinimide] monoammonium salt of spiro[(3,5-dihydroxyboroxin)-1,1'-(3',5'-dihydroxyboroxin)], the N,N'-(4-azaheptamethylene)-bis[polybutenyl(1300)succinimide] monoammonium salt of spiro[(3,5-dihydroxyboroxin)-1,1'-(3',5'-dihydroxyboroxin)], the N,N' - (4,8 - diazaundecamethylene)-bis[polyethenyl(1200)succinimide] monoammonium salt of spiro[(3,5-dihydroxyboroxin)1,1'-(3',5'-dihydroxyboroxin)], the N,N' - (4,8 - diazaundecamethylene)-bis[polybutenyl(1200)succinimide] monoammonium salt of spiro[(3,5-dihydroxyboroxin)-1,1'-(3',5'-dihydroxyboroxin)], the N,N'-(4,8,12-triazapentadecamethylene)-bis[polypropenyl(900)succinimide] monoammonium salt of spiro[(3,5 - dihydroxyboroxin)-1,1'-(3',5'-dihydroxyboroxin)], the N,N'-(4,8,12-triazapentadecamethylene)-bis[polybutenyl(1500)succinimide] monoammonium salt of spiro[(3,5 - dihydroxyboroxin)-1,1'-(3',5'-dihydroxyboroxin)], the N,N' - (5-azanonamethylene)-bis[polybutenyl(1800)succinimide] monoammonium salt of spiro[(3,5-dihydroxyboroxin)-1,1'-(3',5'-dihydroxyboroxin)], the N,N' - (3-aza-2,5-dimethylpentamethylene)-bis[polypropenyl(1800)succinimide] monoammonium salt of spiro[(3,5-dihydroxyboroxin) - 1,1' - (3',5' - dihydroxyboroxin)], the N,N' - (3-aza-2,5-dimethylpentamethylene)-bis[polybutenyl(1300)succinimide] monoammonium salt of spiro[(3,5 - dihydroxyboroxin) - 1,1'-(3',5'-dihydroxyboroxin)], the N,N' - (3,6 - diaza-2,5,8-trimethyloctamethylene)-bis[polybutenyl(1200)succinimide] monoammonium salt of spiro[(3,5-dihydroxyboroxin)-1,1'-(3',5'-dihydroxyboroxin)], the N,N' - (4-aza-3,7-dimethylheptamethylene)-bis[polybutenyl(800)succinimide] monoammonium salt of spiro[(3,5 - dihydroxyboroxin) - 1,1'-(3',5'-dihydroxyboroxin)], and the like.

The monoammonium spiro salts made from 3,5-dialkyl-4-hydroxybenzylamines (f) can be prepared by reacting a 2,6-dialkyl phenol in which the alkyl groups contain from 3 to 12 carbon atoms, formaldehyde, and a primary or secondary amine in which the hydrocarbon portion thereof is in conformity with the groups designated hereinabove as $R_8$ and $R_9$, and then reacting the resulting product with boric acid. In conducting the process a monohydric alcohol containing from 1 to 6 carbon atoms is preferably used as the reaction solvent for preparing the intermediate. For the reaction with boric acid benzene, toluene, mineral oil or other hydrocarbon is used as the reaction solvent. The reaction temperature throughout the whole process is of the order of about 25° C. to about 150° C.

In conducting the process to prepare the intermediate 3,5-dialkyl-4-hydroxybenzylamine, the relative proportions of the three reactants, phenol, formaldehyde and amine, are varied depending upon the particular type of 3,5-dialkyl-4-hydroxybenzylamine being prepared. Thus, when preparing the N,N-dihydrocarbon substituted 3,5-dialkyl-4-hydroxybenzylamines, one mol of formaldehyde and one mol of dihydrocarbon substituted amine, i.e., secondary amine, are employed per mol of appropriate 2,6-dialkyl phenol. When preparing N-hydrocarbon-N,N-bis (3,5-dialkyl-4-hydroxybenzyl)amine, one mol of formaldehyde and one-half of a mol of monohydrocarbon substituted amine, i.e., primary amine, are reacted per mol of appropriately substituted 2,6-dialkyl phenol used. When preparing the compounds which contain one hydrogen atom and one hydrocarbon group on the nitrogen atom, one mol of a formaldehyde and a large excess of primary amine are employed per mol of 2,6-dialkyl phenol used. This substantial excess of primary amine is of the order of about 8 to about 10 mols per mol of phenol used. This particular reaction is conducted in a large amount of monohydric alcohol solvent in order to achieve dilution of the reactants.

The new 3,5-dialkyl-4-hydroxybenzylammonium salts of spiro[(3,5 - dihydroxyboroxin)-1,1'-(3',5'-dihydroxyboroxin)] and a method for their preparation are illustrated by the following examples wherein parts are by weight.

EXAMPLE 41

In a suitable reaction vessel equipped with stirring means, reflux means, thermometer and reagent introducing means are placed 89 parts of 2,6-diisopropylphenol, 248 parts of 25 percent aqueous dimethylamine solution and 500 parts of ethanol. To this solution is added 75 parts of 37 percent formalin solution at room temperature and the mixture refluxed for 4 hours at 83° C. The reaction mixture is then hydrolyzed with excess cold water and the solid product, N,N-dimethyl-3,5-diisopropyl-4-hydroxybenzylamine, filtered off. The amine intermediate is then returned to the reaction vessel to which a Dean-Stark trap has been added, with toluene and 155 parts of boric acid is charged. The resulting mixture is then heated at reflux while removing water of reaction by azeotropic distillation. The toluene is then stripped to leave the desired product, which is the N,N-dimethyl-3,5-diisopropyl-4-hydroxybenzylammonium salt of spiro[(3,5-dihydroxyboroxin)-1,1'-(3',5'-dihydroxyboroxin)].

EXAMPLE 42

In the manner of Example 41, 159 parts of 2,6-di-(1,1,-3,3-tetramethylbutyl)phenol, 45 parts of 37 percent aqueous formalin solution, 29 parts of 40 percent aqueous ethyl amine solution and 77.5 parts of boric acid are reacted to provide the N-ethyl-bis-[3,5-di-(1,1,3,3-tetramethylbutyl)-4-hydroxybenzyl]ammonium salt of spiro[(3,5-dihydroxyboroxin)-1,1'-(3',5'-dihydroxyboroxin)].

Other typical compounds which can be used to prepare the salts of this invention include:

N-benzyl-3,5-di-tert-butyl-4-hydroxybenzylamine,
N-(3,5-xylyl)-3,5-di-tert-amyl-4-hydroxybenzylamine,
N-(p-butylbenzyl)-bis-(3,5-di-tert-butyl-4-hydroxybenzyl)amine,
N-α-naphthyl-bis(3,5-diisopropyl-4-hydroxybenzyl)amine,
N-p-tolyl-bis[3,5-di(2-dodecyl)-4-hydroxybenzyl]amine,
N,N-diphenyl-3,5-di(2-hexyl)-4-hydroxybenzylamine,
N-phenyl-N-p-tolyl-3,5-di(2-amyl)-4-hydroxybenzylamine,
N-p-octylphenyl-3-ethyl-5-tert-butyl-4-hydroxybenzylamine,
N-(2-dodecyl)-[3,5-di(2-hexyl)-4-hydroxybenzyl]amine,
N-methyl-N-ethyl-3,5-di(2-octyl)-4-hydroxybenzylamine,
N-nonyl-3-tert-butyl-5-tert-amyl-4-hydroxybenzylamine,
N,N-diisobutyl-3,5-di-tert-amyl-4-hydroxybenzylamine,
N,N-dioctyl-3,5-di(1,1,3,3-tetramethylbutyl)-4-hydroxybenzylamine,
N-methyl-bis(3,5-di-tert-amyl-4-hydroxyzenzyl)amine,
N-heptyl-bis(3,5-di-tert-amyl-4-hydroxybenzyl)amine,
N-ethyl-3,5-di-tert-butyl-4-hydroxybenzylamine,
N-isohexyl-3,5-di-tert-butyl-4-hydroxybenzylamine,
N,N-dipropyl-3,5-di-tert-butyl-4-hydroxybenzylamine,
N-ethyl-bis(3,5-di-tert-butyl-4-hydroxybenzyl)amine,
N-butyl-bis(3,5-di-tert-butyl-4-hydroxybenzyl)amine,
and the like.

The compounds just described (f) are soluble in various organic solvents and in gasolines, diesel fuels, lubricating oils, particularly hydrocarbon oils and the like, wherein they function as antioxidants and rust inhibitors. Usual concentrations are of the order of 0.1% to 10% by weight.

The spiro hydroxyboroxin-amine salts of monoalkenylsuccinimides of N-alkylpiperazines (g) can be prepared by reacting an alkenylsuccinic anhydride (as aforedescribed) with an N-(aminoalkyl)piperazine to prepare an intermediate which is then reacted with boric acid to prepare the compounds of this invention. Typical piperazines which can be used are N-methyl-N'-2-(aminoethyl)piperazine, N - isopropyl - N' - (2-aminoethyl)piperazine, N - (2-amino-1-methylethyl)piperazine, and the like.

The reaction of alkenylsuccinic anhydride and a substituted piperazine can be at from about 100° C. to 200° C., preferably from 125° C. to 175° C. The alkenylsuccinic anhydride and the piperazine derivative are reacted in about equal molar quantities. The reaction of the intermediate with boric acid is conducted in the usual manner at temperatures of 25°-150° C.

The preparation of the new ammonium salts based upon such alkenylsuccinimides is illustrated in the following example wherein parts are parts by weight.

EXAMPLE 43

A mixture of 18 parts (0.14 mol) or N-(2-aminoethyl)piperazine and 200 parts (0.13 mol) of polybutenylsuccinic anhydride in which the alkenyl group has an average molecular weight of about 1000, are blended with agitation in a suitable vessel and heated to a temperature of 150° C., after which the absolute pressure is reduced to about 50 mm. Hg to remove excess amine and water. The reaction mixture is then allowed to reach room temperature at the reduced pressure. Thereafter toluene and 40.4 parts of boric acid are charged and the resulting mixture heated at reflux while continuously removing water of reaction. After stripping the toluene there remains the N-[2-(polybutenylsuccinimido)ethyl]piperazinium salt of spiro[(3,5-dihydroxyboroxin)-1,1'-(3',5'-dihydroxyboroxin)].

The preparation of the salts of N-dialkylaminoalkyl monoalkenylsuccinimides (h) can be effected by reacting a monoalkenylsuccinic anhydride with a dialkylaminoalkylamine to form a monoalkenylsuccinimide which is then reacted with boric acid to form the desired ammonium salt.

The reaction between alkenylsuccinic anhydride and amine can be made at from above 100° C. to 200° C., preferably from 125° C.–175° C. The alkenylsuccinic anhydride and the amine are reacted in about equal molar quantities. An excess of the amine can be used, and the unreacted amine removed by distillation. The reaction with boric acid is conducted in the same manner as hereinbefore described.

Amine reactants include dimethylaminomethylamine, dimethylaminoethylamine, dimethylaminopropylamine, dimethylaminobutylamine, diethylaminomethylamine, diethylaminopropylamine, dipropylaminopropylamine, methylpropylaminopropylamine, propylbutylaminoethylamine, and the like. Thus, $R_{11}$ includes the methylene, ethylene, trimethylene, propylene, butylene and tetramethylene and $R_{12}$ and $R_{13}$ can be an alkyl radical, such as methyl, ethyl, propyl, octyl, etc.

The preparation of the N-dialkylaminoalkyl alkenylsuccinimide monoammonium salts of spiro[(3,5-dihydroxyboroxin)-1,1'-(3',5'-dihydroxyboroxin)] is illustrated in the following example wherein parts are parts by weight.

EXAMPLE 44

Using a suitable reaction vessel, a mixture of 9.2 parts (0.09 mol) of 3-(dimethylamino)propylamine and 150 parts (0.09 mol) of polybutenylsuccinic anhydride in which the alkenyl group has an average molecular weight of about 1000, is blended with agitation and the resulting mixture is heated at 175° C. for a period of one hour, after which the absolute pressure is reduced to about 50 mm. Hg at this temperature for a period of 60 minutes to facilitate the removal of water. The reaction mixture is then allowed to reach room temperature at the reduced pressure. Thereafter, toluene and 28 parts of boric acid are charged and the resulting mixture heated at reflux while azeotropically removing water formed in the reaction. The toluene is then stripped to leave the N - [3 - (dimethylamino)propyl]polybutenylsuccinimide monoammonium salt of spiro[(3,5-dihydroxyboroxin)-1, 1'-(3',5'-dihydroxyboroxin)].

The monoammonium salts of this invention based upon the Schiff bases (i) can be prepared by first preparing a Schiff base by reacting (i) an alkenylsuccinic anhydride represented by the structure

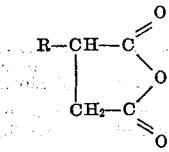

or the acid thereof, with (ii) an azaalkylenediamine represented by the structure

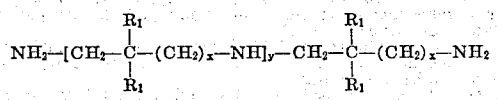

to produce
an intermediate product, an imide (which is an alkenylsuccinimidoazaalkylamine), represented by the structure

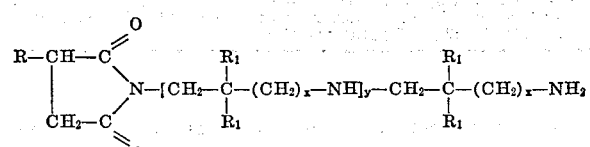

which is in turn reacted with (iii) a carbonyl-containing aromatic or heterocyclic compound represented by the structure

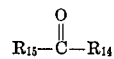

where R, $R_1$, $R_{14}$, $R_{15}$, $x$ and $y$ have their aforedescribed significance. The mol ratios of (i):(ii):(iii) reacted will be about 1:1:1, respectively. The Schiff base is then reacted with boric acid in the usual manner at temperatures of 25°–150° C. in a ratio of five mols of boric acid per mol of azaalkylenediamine.

The alkenylsuccinic anhydrides or acids useful in preparing the Schiff bases can be prepared from an olefin or olefin polymer and maleic anhydride as previously described. The azaalkylenediamines useful in preparing the Schiff bases are the azaalkylenediamines as described above.

As is evident from the foregoing, the carbonyl-containing compound can be an aldehyde or ketone. The aldehydes can be of an aromatic or heterocyclic nature. Representative examples of such aldehydes where $R_{14}$ is a phenyl radical and $R_{15}$ is hydrogen are benzaldehyde; alkyl-substituted benzaldehyde, e.g., 2-, 3- and 4-methylbenzaldehyde, 2,6- and 3,5-dimethylbenzaldehyde, 2-, 3- and 4-ethylbenzaldehyde, 4-isopropylbenzaldehyde, 2-isobutylbenzaldehyde; 4-octylbenzaldehyde, 2,3,6- and 2,4,5-trimethylbenzaldehyde, 2,3,5,6 - tetramethylbenzaldehyde; halogen-substituted benzaldehyde, e.g., 2-fluorobenzaldehyde, 2-, 3- and 4-chlorobenzaldehyde, 2-, 3- and 4-bromobenzaldehyde, 2-iodobenzaldehyde, 3,4-dichlorobenzaldehyde, 2,3,5-trichlorobenzaldehyde, pentachlorobenzaldehyde, 2-(trifluoromethyl)benzaldehyde; alkoxy-substituted benzaldehyde, e.g., 2- and 3-methoxybenzaldehyde, 4-methoxybenzaldehyde (anisaldehyde), 2-, 3- and 4-ethoxybenzaldehyde, 2,3- and 3,4 - dimethoxybenzaldehyde. Other substituents can include nitro, as in 2-nitrobenzaldehyde; amino, as in 2-aminobenzaldehyde and 4-(diethylamino)benzaldehyde; benzyloxy, as in 3-(benzyloxy)benzaldehyde; carboxyl, as in benzaldehyde-2-carboxylic acid; phenoxy, as in 2-phenoxybenzaldehyde; vinyl, as in 2-vinylbenzaldehyde; and cyano, as in 2-cyanobenzaldehyde.

In the case where $R_{14}$ is a naphthyl radical and $R_{15}$ is hydrogen typical starting aldehydes are for example 1- and 2-naphthaldehyde, 4-methoxy-1-naphthaldehyde, 4-phenyl-2-naphthaldehyde, and the like. Where $R_{14}$ is a furyl radical and $R_{15}$ is hydrogen starting aldehydes include 2- and 3-furfuraldehyde, 4-methyl-2-furfuraldehyde, and the like.

When $R_{15}$ is not hydrogen the carbonyl-containing aromatic or heterocyclic compound is a ketone, which can be of an aromatic, heterocyclic or mixed structure.

The ketones which are useful are illustrated by acetophenone, propiophenone, butyrophenone, pelargonophenone, capriphenone, hendecanophenone, acetonaphthone, capronaphthone, arachidophenone, stearonaphthone, methyl 2-naphthyl ketone, benzophenone, 4,4'-bis(dimethylamino)benzophenone, 4-methylbenzophenone, 4,4'-dimethyl benzophenone, di-1-naphthyl ketone, 4-methyl-1-naphthyl 1-naphthyl ketone, 4-methoxy-1-naphthyl 1-naphthyl ketone, 4-amino-1-naphthyl 1-naphthyl ketone, 1-naphthyl phenyl ketone, difuryl ketone, methyl furyl ketone, phenyl furyl ketone, 1-naphthyl furyl ketone.

The intermediate imides described above can be prepared by heating a toluene or other hydrocarbon solution of an alkenylsuccinic anhydride and an azaalkylenediamine at temperatures of the order of about 100° C. to about 200° C., using mol ratios of anhydride to polyamine of about 1:1 while at the same time continuously removing the water formed from the reaction.

The imides are then reacted with a carbonyl-containing aromatic or heterocyclic compound while continuously removing the water formed from the reaction to provide the Schiff bases. To provide a reaction medium and to facilitate the removal of the water of reaction, the preparation of the Schiff bases is generally carried out in a hydrocarbon solvent, e.g., toluene, xylene or mineral oil. Likewise, the preparation of the Schiff bases used to prepare the salts of the present invention can be carried out in a mineral oil solution or dispersion. The mineral oil can be used alone or in combination with a solvent. Suitable temperatures for preparng the Schiff bases at atmospheric pressure are of the order of 50° to 200° C. Thereafter the Schiff base is reacted with boric acid at temperatures of the order of 25°–150° C. using toluene or other hydrocarbon as a reaction medium or a combination of mineral oil and toluene.

The preparation of a monoammonium pentaborate derived from such Schiff bases is illustrated in the following non-limiting detailed example, wherein parts are parts by weight.

Example 45

Into a suitable reaction vessel fitted with a mechanical stirrer, heating mantle, thermometer, Dean-Stark trap and condenser, containing 300 ml. of toluene and 74.3 parts of diethylenetriamine, there is charged 917 parts of polybutenyl(980)succinic anhydride. The resulting mixture is then heated, with stirring, to reflux and maintained at reflux until the evolution and collection of water ceases. The reaction mixture is then cooled to about 70° C., 76.4 parts of benzaldehyde is charged, and heating at reflux is continued until the evolution and collection of water ceases. 223 parts of boric acid are added and the resulting mixture heated at reflux while removing water of reaction by azeotropic distillation. The toluene is then stripped to provide the N-benzylidene-5-(polybutenylsuccinimido)-3-azapentylamine monoammonium salt of spiro[(3,5-dihydroxyboroxin) - 1,1' - (3',5'-dihydroxyboroxin)].

Additional examples of other Schiff base derived monoammonium pentaborates and the materials for their preparation other than boric acid are given in Table IV, below. In the table only the alkenyl, or polyalkenyl, portion of the alkenylsuccinic anhydride and the average molecular weight of such portion are given, DETA means diethylenetriamine, TETA means triethylenetetramine and TEPA means tetraethylenepentamine. In all cases five mols of boric acid are used per mol of azaalkylenediamine (b).

Typical examples of other Schiff base derived monoammonium pentaborate salts of this invention are:

the N-benzylidene-5-[polypropenyl(1500)succinimido]-3-azapentylamine monoamonium salt of spiro[(3,5-dihydroxyboroxin)-1,1'-(3',5'-dihydroxyboroxin)], the N-benzylidene-7-[polybutenyl(980)succinimido]-4-azaheptylamine monoamonium salt of spiro[(3,5-dihydroxyboroxin)-1,1'-(3',5'-dihydroxyboroxin)], the N-furfurylidene-7-[polybutenyl(900)succinimido]-4-azaheptylamine monoammonium salt of spiro[(3,5-dihydroxyboroxin)-1,1'-(3',5'-dihydroxyboroxin)], the N-benzylidene-8-[polybutenyl(1350)succinimido]-3,6-diazaoctylamine monoammonium salt of spiro[(3,5-dihydroxyboroxin)-1,1'-(3',5'-dihydroxyboroxin)], the N-(3-isopropylbenzylidene)-8-[polybutenyl(1300)succinimido]-3,6-diazaoctylamine monoammonium salt of spiro[(3,5-dihydroxyboroxin)1,1'-(3',5'-dihydroxyboroxin)], the N-benzylidene-11-[polybutenyl(900)succinimido]-3,6,9-triazaundecylamine monoammonium salt of spiro[(3,5-dihydroxyboroxin)-1,1'-(3',5'-dihydroxyboroxin)], the N-(1-naphthylmethylene)-11-[polybutenyl(900)succinimido]-3,6,9-triazaundecylamine monoammonium salt of spiro[(3,5-dihydroxyboroxin)-1,1'-3',5'-dihydroxyboroxin)], the N-furfurylidene-11-[polybutenyl(980)succinimido]-3,6,9-triazaundecylamine monoammonium salt of spiro[(3,5-dihydroxyboroxin)-1,1'-(3',5'-dihydroxyboroxin)], the N-(2-chlorobenzylidene)-11-[polybutenyl(980)succinimido]-3,6,9-triazaundecylamine monoammonium salt of spiro[(3,5-dihydroxyboroxin)-1,1'-(3',5'-dihydroxyboroxin)], the N-(diphenylmethylene)-5-[polybutenyl(980)succinimido]-3-azapentylamine monoammonium salt of spiro[(3,5-dihydroxyboroxin)-1,1'-(3,5'-dihydroxyboroxin)], the N-(phenylethylmethylene)-7-[polybutenyl(1000)succinimido]-4-azaheptylamine monoammonium salt of spiro[(3,5-dihydroxyboroxin)-1,1'-(3',5'-dihydroxyboroxin)], the N-(2-naphthylpropylmethylene)-5-[polypropenyl(1200)succinimido]-3-azapentylamine monoammonium salt of spiro[(3,5-dihydroxyboroxin)-1,1'-(3',5'-dihydroxyboroxin)], the N-(1-naphthylphenylmethylene)-7-[polybutenyl(1100)succinimido]-4-azaheptylamine monoammonium salt of spiro[(3,5-dihydroxyboroxin)-1,1'-(3',5'-dihydroxyboroxin)], and the like.

TABLE IV

| Ex. No. | Alkenyl portion of alkenylsuccinic anhydride (mol wt. of alkenyl group) (a) | Azaalkyl-enediamine (b) | Carbonyl-containing compound (c) | Molar ratio (a):(b):(c) | Product |
|---|---|---|---|---|---|
| 46 | Polybutenyl (1,315) | DETA | Benzaldehyde | 1:1:1 | The N-benzylidene-5-[polybutenyl(1315)succinimido]-3-azapentylamine monoammonium salt of spiro[(3,5-dihydroxyboroxin)-1-,1'-(3',5'-dihydroxyboroxin)]. |
| 47 | Polybutenyl (980) | TETA | do | 1:1:1 | The N-benzylidene-8-[polybutenyl(980)succinimido]-3,6-diazaocylamine monoammonium salt of spiro[(3,5-dihydroxyboroxin)-1,1'-(3',5'-dihydroxyboroxin)]. |
| 48 | do | TEPA | do | 1:1:1 | The N-benzylidene-11-[polybutenyl(980)succinimido]-3,6,9-triazaundecylamine monoammonium salt of spiro[(3,5-dihydroxyboroxin)-1,1'-(3',5'-dihydroxyboroxin)]. |
| 49 | do | DETA | Acetophenone | 1:1:1 | The N-(α-methylbenzylidene)-5-[polybutenyl(980)succinimido]-3-azapentylamine monoammonium salt of spiro[(3,5-dihydroxyboroxin)-1,1'-(3',5'-dihydroxyboroxin)]. |
| 50 | do | TETA | Benzophenone | 1:1:1 | The N-(diphenylmethylene)-8-[polybutenyl(980)succinimido]-3,6-diazaoctylamine monoammonium salt of spiro[(3,5-dihydroxyboroxin)-1,1'-(3',5'-dihydroxyboroxin)]. |
| 51 | Polybutenyl (1,350) | TEPA | Butyronaphthone | 1:1:1 | The N-(butylnaphthylmethylene)-11-[polybutenyl(1350)succinimido]-3,6,9-triazaundecylamine monoammonium salt of spiro[(3,5-dihydroxyboroxin)-1,1'-(3',5'-dihydroxyboroxin)]. |
| 52 | Polybutenyl (980) | TEPA | Furfural | 1:1:1 | The N-furfurylidene-11-[polybutenyl(980)succinimido]-3,6,9-triazaundecylamine monoammonium salt of spiro[(3,5-dihydroxyboroxin)-1,1'-(3',5'-dihydroxyboroxin)]. |
| 53 | Polybutenyl (1,350) | TETA | 1-naphthaldehyde | 1:1:1 | The N-(1-naphthylmethylene)-11-[polybutenyl-(1350)succinimido]-3,6,9-triazaundecylamine monoammonium salt of spiro[(3,5-dihydroxyboroxin)-1,1'-(3',5'-dihydroxyboroxin)]. |

The monoammonium spiro hydroxyboroxin salts of this invention based upon the imines (j) can be prepared by reacting (i) an alkenylsuccinic anhydride represented by the structure

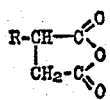

or the acid thereof, with
(ii) a polyamine represented by the structure $$NH_2—R_{16}—NH_2$$

to produce
an intermediate product, an imide, represented by the structure

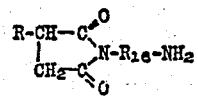

which is then reacted with
(iii) a carbonyl-containing compound, that is, an aldehyde or a ketone, represented by the structure

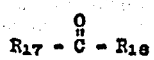

where R, $R_{16}$, $R_{17}$ and $R_{18}$ have their aforedescribed significance, to produce an imine (j). The mol ratios of (i):(ii):(iii) which are used are about 1:1:1, respectively. Thereafter the imine (j) and boric acid are reacted in the usual manner in mol ratios of 1:5, respectively, and temperatures of 25–150° C., preferably 60–110° C., to produce imine-based monoammonium salts of spiro [(3,5-dihydroxyboroxin)-1,1'-(3',5'-dihydroxyboroxin)].

The alkenylsuccinic anhydride or acids which are useful are those previously described. The polyamines which can be used to provide the radical $R_{16}$ are aminoguanidine, 1,3-diaminoguanidine and biguanide.

The carbonyl-containing compounds useful in preparing the imine-based spiro hydroxyboroxin-amine salts can be an aldehyde or a ketone, as mentioned above, and they can be of an aliphatic or aromatic nature. Typical examples of aliphatic aldehydes, where $R_{17}$ is hydrogen, an alkyl, alkenyl or haloalkyl radical and $R_{18}$ is hydrogen, are formaldehyde, acetaldehyde, propionaldehyde, n-butyraldehyde, isobutyraldehyde, n-valeraldehyde, iso-valeraldehyde, pivaldehyde, caproaldehyde, pelagonaldehyde, capraldehyde, lauraldehyde, myristaldehyde, stearaldehyde, and the like; substituted aldehydes such as chloroacetaldehyde, chloral, butylchloral, trifluoroacetaldehyde, aldol, and the like; and unsaturated aldehydes such as 2- and 3-butenal, 2-propenal, 2-methyl, 2-propenal, 3- and 4-pentenal, 3-, 4- and 5-hexenal, 2-ethyl-3-hexenal, 3-decenal and the like.

Representative examples of aromatic aldehydes where $R_{17}$ is a phenyl radical and $R_{18}$ is hydrogen are benzaldehyde; alkyl-substituted benzaldehyde, e.g., 2-, 3- and 4-methylbenzaldehyde, 2,6- and 3,5-dimethylbenzaldehyde, 2-, 3- and 4-ethylbenzaldehyde, 4-isopropylbenzaldehyde, 2-isobutylbenzaldehyde; 4-octylbenzaldehyde, 2,3,6-, 2,4, 6- and 2,4,5-trimethylbenzaldehyde, 2,3,5,6-tetramethyl-benzaldehyde; halogen-substituted benzaldehyde, e.g., 2-fluorobenzaldehyde, 2-, 3- and 4-chlorobenzaldehyde, 2-, 3- and 4-bromobanzaldehyde, 3-iodobenzaldehyde, 3,4-dichlorobenzaldehyde, 2,3,5-trichlorobenzaldehyde, pentachlorobenzaldehyde, 2-trifluoromethylbenzaldehyde; alkoxy-substituted benzaldehyde, e.g., 2- and 3-methoxybenzaldehyde, 4-methoxybenzaldehyde (anisaldehyde), 2-, 3- and 4-ethoxybenzaldehyde, 2,3- and 3,4-dimethoxybenzaldehyde. Other substituents can include nitro, as in 2-nitrobenzaldehyde; amino, as in 2-aminobenzaldehyde and 4-diethylaminobenzaldehyde; benzyloxy, as in 3-benzyloxybenzaldehyde; carboxyl, as in benzaldehyde-2-carboxylic acid; phenoxy, as in 2-phenoxybenzaldehyde; vinyl, as in 2-vinylbenzaldehyde; and cyano, as in 2-cyanobenzaldehyde.

In the case where $R_{17}$ is a naphthyl radical and $R_{18}$ is hydrogen, typical starting aldehydes are, for example, 1- and 2-naphthaldehyde, 4-methoxy-1-naphthaldehyde, 4-phenyl-2-naphthaldehyde, and the like. Where $R_{17}$ is a furyl radical and $R_{18}$ is hydrogen starting aldehydes include 2- and 3-furfuraldehyde, 5-methylfurfuraldehyde, and the like.

Typical examples of aliphatic ketones, that is, where $R_{17}$ and $R_{18}$ are alkyl, alkenyl or haloalkyl are acetone, methyl ethyl ketone, methyl propyl ketone, methyl isopropyl ketone, methyl butyl ketone, methyl isobutyl ketone, methyl sec-butyl ketone, methyl tert.-butyl ketone, methyl cyclobutyl ketone, cyclohexanone, methyl neopentyl ketone, methyl tert.-amyl ketone, methyl n-amyl ketone, methyl hexyl ketone, methyl cyclohexyl ketone, methyl n-heptyl ketone, methyl n-octyl ketone, methyl nonyl ketone, methyl decyl ketone, diethyl ketone, di-n-propyl ketone, diisopropyl ketone, ethyl isopropyl ketone, ethyl isobutyl ketone, ethyl n-propyl ketone, ethyl tert.-butyl ketone, ethyl n-butyl ketone, tert.-butyl isopropyl ketone, n-propyl isopropyl ketone, diisobutyl ketone, hendecyl pentyl ketone, dodecyl pentyl ketone, tetradecyl hexyl ketone, tetradecyl isobutyl ketone, hexadecyl octyl ketone, 2- and 3-methyl-1-penten-4-one, 1-hepten-4-one ketone, dinonadecyl ketone, dioctadecyl ketone, 3- and 4-methyl-2-hexanone, 3,4-dimethyl-2-pentanone, 3-ethyl-2-pentanone, 2-ethyl-2 - decanone, 6-methyl-7-octadec-anone 5,7-dimethyl-9-heneicosanone, and the like; substituted ketones such as 1-chloro-2-propanone, 1-chloro-2-pentanone, 1,2-dichloro-3-pentanone, 1-bromo-7-nitro-4-heptanone, 1-chloro-7-octadecanone, and the like; unsaturated ketones such as vinyl methyl ketone, vinyl ethyl ketone, 2- and 3-methyl-1-penten 4-one, 1-hepten-4-one 3-methyl-1-hexen-5-one, 4-methyl-5-hexen-2-one, 5-methyl-6-nonadecen-2-one, and the like.

In the case where $R_{17}$ is a phenyl radical and $R_{18}$ is an alkyl, alkenyl or haloalkyl typical starting ketones are acetophenone, propiophenone, arachidophenone, acrylophenone, crotonophenone, chalcone, p-bromo-acetophenone, p-chloro-acetophenone, p-bromo-α-chloroacetophenone, and the like. Where $R_{17}$ and $R_{18}$ are each a phenyl radical starting ketones include benzophenone, 4,4' - bis(dimethylamino)benzophenone, 4-methylbenzophenone, 4,4'-dimethylbenzophenone, 4,4'-dichlorobenzophenone, 2-, 3- and 4-chlorobenzophenone, 2-, 3- and 4-bromobenzophenone, and the like. Where $R_{17}$ is a phenyl radical and $R_{18}$ is a naphthyl radical typical starting ketones are 1- and 2-naphthyl phenyl ketone, 1-methyl-2-naphthyl phenyl ketone, 3-methyl-2-naphthyl phenyl ketone, 2,3-dimethyl-1-naphthyl phenyl ketone, 1-naphthyl ortho-tolyl ketone, 1-naphthyl 2-chlorophenyl ketone, and the like. Where $R_{17}$ is a phenyl radical and $R_{18}$ is a furyl radical starting ketones are ortho-tolyl furyl ketone, 2,3-dimethylphenyl furyl ketone, and the like.

When $R_{17}$ is a naphthyl radical and $R_{18}$ is an alkyl, alkenyl or haloalkyl radical typical starting ketones are 1-naphthyl methyl ketone, 1-naphthyl ethyl ketone, 2-naphthyl propyl ketone, 2-naphthyl octyl ketone, 1-naphthyl nonyl ketone, 1-naphthyl octadecyl ketone, 1-naphthyl 2-chlorooctyl ketone, 1-naphthyl 2-butenyl ketone, 1-naphthyl 3-pentenyl ketone, 1-naphthyl 4-octadecenyl ketone, 2-chloro-1-naphthyl decyl ketone, 2,3-dibromo-1-naphthyl dodecyl ketone, and the like. Where $R_{17}$ and $R_{18}$ are each a naphthyl radical typical ketones are di(1-naphthyl) ketone, di(2-naphthyl) ketone, 2-methyl-1-naphthyl 1-naphthyl ketone, 4-methoxy-1-naphthyl 1-naphthyl ketone, 2-chloro-1-naphthyl 3-chloro-1-naphthyl ketone, and the like. Where $R_{17}$ is a naphthyl radical and $R_{18}$ is a furyl radical typical starting ketones are 1-naphthyl furyl ketone, 2-methyl-1-naphthyl furyl ketone, 3-chloro-1-naphthyl furyl ketone, 4-methoxy-1-naphthyl furyl ketone, and the like.

In the case where $R_{17}$ is a furyl radical and $R_{18}$ is an alkyl, alkenyl or haloalkyl radical typical ketones are furyl methyl ketone, furyl octyl ketone, furyl dodecyl ketone, furyl 2-butenyl ketone, furyl 4-dodecyl ketone, furyl 2-butenyl ketone, furyl 4-dodecenyl ketone, furyl chloroethyl ketone, and the like. Where both $R_{17}$ and $R_{18}$ are a furyl radical, an example of a starting ketone is difuryl ketone.

The various imides resulting from the first step in the preparation of the instant compounds can be prepared by heating a mineral oil, toluene or other hydrocarbon solution of an alkenylsuccinic anhydride and a polyamine at temperatures of the order of about 50° C. to about 200° C., using mol ratios of anhydride to polyamine of about 1:1 while at the same time continuously removing the water formed from the reaction.

It is thus evident that suitable imides prepared as heretofore explained are 1-(polyalkenylsuccinimido) guanidines, 1-amino-3 - (polyalkenylsuccinimido) guanidines, or 1-guanyl-N - (polyalkenylsuccinimido) formamidines.

The imides, as described above, are then reacted with a carbonyl-containing compound in mineral oil or other inert hydrocarbon solvents at temperatures of the order of about 50° C. to about 200° C., using mol ratios of imide to carbonyl-containing compound of about 1:1, respectively, while continuously removing the water formed from the reaction. The thus prepared imine is then reacted with boric acid using a 1:5 molar ratio, respectively, at temperatures of about 25–150° C., preferably 60–110° C., while continuously removing the water of reaction. Typical examples of the instant salts are therefore:

1 - (benzylidene) - 3 - [polypropenyl(1500)succinimido]- guanidine monoammonium salt of spiro[(3,5-dihydroxyboroxin)-1,1'-(3',5'-dihydroxyboroxin)], 1 - (benzylidene) - 3 - [polybutenyl(1500)succinimido] guanidine monoammonium salt of spiro[(3,5-dihydroxyboroxin)-1,1'-(3',5'-dihydroxyboroxin)], 1 - (aminobenzylidene) - 3 - [polybutenyl(1300)succinimido]guanidine monoammonium salt of spiro[(3,5-dihydroxyboroxin)-1,1'-(3',5'-dihydroxyboroxin)], 1 - (aminopropylidene) - 3 - [polypropenyl(1000)succinimido]guanidine monoammonium salt of spiro[(3,5-dihydroxyboroxin)-1,1'-(3',5'-dihydroxyboroxin)], 1 - (aminodecylidene) - 3 - [polybutenyl(900)succinimido]guanidine monoammonium salt of spiro[(3,5-dihydroxyboroxin)-1,1'-(3',5'-dihydroxyboroxin)], 1 - (benzylidene) - 3 - [imino(polypropenyl(1300)succinimido)methyl]guanidine monoammonium salt of spiro- [(3,5-dihydroxyboroxin)-1,1'-(3',5'-dihydroxyboroxin)], 1 - (benzylidene) - 3 - [imino(polybutenyl(850)succinimido)methyl]guanidine monoammonium salt of spiro- [(3,5-dihydroxyboroxin)-1,1'-(3',5'-dihydroxyboroxin)], and 1 - (butylidene) - 3 - [imino(polybutenyl(1350)succinimido)methyl]guanidine monoammonium salt of spiro- [(3,5-dihydroxyboroxin)-1,1'-(3',5'-dihydroxyboroxin)].

The preparation of the salts presently under discussion is illustrated in the following non-limiting detailed examples, wherein parts are parts by weight.

EXAMPLE 54

To a suitable reaction vessel there is charged 13.6 parts of aminoguanidine bicarbonate (0.1 mol) and 200 parts of polybutenylsuccinic anhydride (the polybutenyl group has an average molecular weight of 1350) in 100 ml. of toluene. The resulting mixture is heated at reflux until the evolution of carbon dioxide ceases and all water of reaction has been removed. After the reaction mass is filtered 9.4 parts of benzaldehyde (0.1 mol) is added and the reaction mass is then heated at reflux for about two hours while continuously removing water of reaction by azeotropic distillation. The reaction mass is then cooled slightly, 31 parts of boric acid (0.5 mol) is charged and the resulting mixture is heated at about 80° C. for one hour. Water is then removed by azeotropic distillation after which the reaction mass is filtered. Upon removal of the toluene by stripping, there remains the 1-(benzylidene)-3-(polybutenylsuccinimido)guanidine monoammonium salt of spiro[(3,5-dihydroxyboroxin)-1,1'-(3',5'-dihydroxyboroxin)].

EXAMPLE 55

Following the procedure of Example 54 15.0 parts of 1,3-diaminoguanidine bicarbonate, 133 parts of polybutenylsuccinic anhydride in which the polybutenyl group has an average molecular weight of 980, 4.4 parts of acetaldehyde and 31.0 parts of boric acid are utilized to prepare 1-(aminoethylidene) - 3 - (polybutenylsuccinimido)guanidine monoammonium salt of spiro[(3,5-dihydroxyboroxin)-1,1'-(3',5'-dihydroxyboroxin)].

EXAMPLE 56

Again following the procedure of Example 54, but utilizing 13.1 parts of biguanide carbonate, 200 parts of polybutenylsuccinic anhydride in which the polybutenyl group has an average molecular weight of 1350, 9.4 parts of benzaldehyde and 31.0 parts of boric acid, there is prepared 1-(benzylidene)-3-[imino(polybutenylsuccinimido)methyl]guanidine monoammonium salt of spiro[(3,5-dihydroxyboroxin)-1,1'-(3',5'-dihydroxyboroxin)].

The imidazolidine portion (k) of the 2-substituted imidazolidine monoammonium salts of spiro[(3,5-dihydroxyboroxin)-1,1'-(3',5'-dihydroxyboroxin)] can be represented by the structure

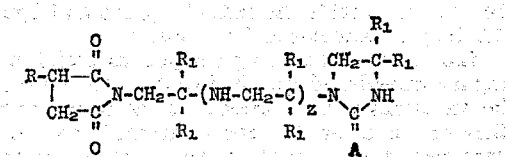

and can be prepared by reacting (i) a polyalkenylsuccinic anhydride represented by the structure

or the acid thereof, with
(ii) a polyethyleneamine represented by the structure

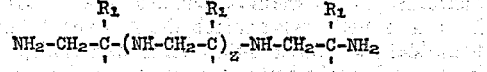

to produce an intermediate product, an imide, represented by the structure

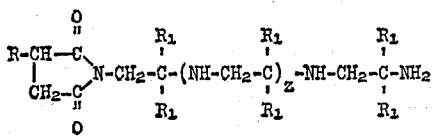

which is then reacted with (iii) urea, thiourea or guanidine, represented by the structure

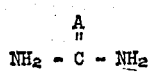

where R, $R_1$, A and z have their aforedescribed significance. The mol ratios of (i):(ii):(iii) used are about 1:1:1, respectively. Thereafter the imidazolidine is reacted in the usual manner with boric acid at temperatures of 25°–150° C. using five mols of boric acid per mol of polyethyleneamine to form the desired monoammonium pentaborate.

The polyalkenylsuccinic anhydrides useful in preparing the 2-substituted imidazolidines can be prepared from an olefin a polymer of a lower olefin or a copolymer of lower olefins and maleic anhydride as described above. The polyethyleneamines which can be used are those described above with respect to the imidazolidines (a). As is evident from the above description where A is oxygen reactant (iii) is urea, when A is sulfur reactant (iii) is thiourea and when A is NH retactant (iii) is guanidine.

The various imides resulting from the first step in the preparation of the instant salts can be prepaerd by heating a polyalkenylsuccinic anhydride and a polyethyleneamine at temperatures of the order of about 75° C. to about 175° C., using mol ratios of anhydride to polyethyleneamine of about 1:1 while at the same time continuously removing the water formed from the reaction. The imides can then be reacted with urea, thiourea or guanidine, by heating therewith at temperatures of the order of 120°–200° C., while continuously removing the ammonia formed from the reaction, to provide 2-substituted imidazolidines. The imidazolidines are in turn reacted with boric acid, in the usual 1:5 molar ratio, by heating therewith at temperatures of the order of 25°–150° C., and thereafter removing the water formed from the reaction.

To provide a reaction medium and to facilitate the removal of the water of reaction, the preparation of the intermediate imide and imidazolidine is generally carried out in a hydrocarbon solvent. The reaction of the imidazolidine with boric acid can also be conducted in a hydrocarbon, such as benzene or toluene.

Typical examples of the 2-substituted imidazoline-based salts of this invention are:

the 1-[5 - (polybutenyl(1350)succinimido)-3-azapentyl]-2-imidazolidinone monoammonium salt of spiro[(3,5-dihydroxyboroxin)-1,1'-(3',5'-dihydroxyboroxin)], the 1-[8-(polypropenyl(700)succinimido)-3,6-diazaoctyl]-2-imidazolidinone monoammonium salt of spiro[(3,5-dihydroxyboroxin)-1,1'-(3',5'-dihydroxyboroxin)], the 1-[8-(polybutenyl(1200)succinimido) - 3,6 - diazaoctyl]-2-imidazolidinone monoammonium salt of spiro [3,5-dihydroxyboroxin)-1,1'-(3',5'-dihydroxyboroxin], the 1-[11 - (polybutenyl(1350)succinimido)-3,6,9-triazaundecyl]-2-imidazolidinone monoammonium salt of spiro[3,5-dihydroxyboroxin)-1,1'-(3',5'-dihydroxyboroxin], the 1-[11 - (polyisobutenyl(1000)succinimido)-3,6,9-triazaundecyl]-2-imidazolidinone monoammonium salt of spiro[3,5-dihydroxyboroxin)-1,1'-(3',5'-dihydroxyboroxin], the 1-[11 - (polybutenyl(1900)succinimido)-3,6,9-triazaundecyl]-2-imidazolidinone monoammonium salt of spiro[3,5-dihydroxyboroxin)-1,1'-(3',5'-dihydroxyboroxin], the 1 - 8 - (polybutenyl(900)succinimido) - 3,6 - diazaoctyl]-2-imidazolidinethione monoammonium salt of spiro[3,5-dihydroxyboroxin)-1,1'-(3',5'-dihydroxyboroxin)], the 1-[11-(polybutenyl(500)succinimido) - 3,6,9 - triazaundecyl]-2-imidazolidinethione monoammonum salt of spiro[3,5-dihydroxyboroxin)-1,1'-(3',5'-dihydroxyboroxin)], the 2-imino-1-[2-(polyisobutenyl(1000)succinimido)ethyl]imidazolidine monoammonium salt of spiro[(3,5-dihydroxyboroxin)-1,1'-(3',5'-dihydroxyboroxin)], the 2-imino-1-[8-(polyethenyl(1500)succinimido)-3,6-diazaoctyl]imidazolidine monoammonium salt of spiro [3,5-dihydroxyboroxin)-1'1,-(3',5'-dihydroxyboroxin)], and the like.

The preparation of typical 2-substituted imidazolidine monoammonium salts of spiro[(3,5-dihydroxyboroxin)-1,1'-(3',5'-dihydroxyboroxin)] is illustrated in the following non-limiting detailed example, wherein parts are parts by weight.

EXAMPLE 57

Into a suitable reaction vessel fitted with a mechanical stirrer, heating mantle, thermometer, Dean-Stark trap and condenser, containing 900 parts of polybutenyl(980) succinic anhydride in process oil, there is charged 103 parts of triethylenetetramine. The resulting solution is heated at 140° C., and 30 mm. of Hg for about five hours as the water evolving from the reaction is removed. When the evolution of water ceases, 42.8 parts of urea are added and the mixture heated to about 185° C. and kept at about that temperature for about 3 hours until the evolution of ammonia has ceased. 218 parts of boric acid is then charged and the mixture heated at about 85°–90° C. for one hour and then at 150° C. and 20 mm. of Hg for one hour. The reaction is then filtered to provide an oil solution of 1-[5-(polybutenylsuccinimido)-3-azapentyl]-2-imidazolidinone monoammonium salt of spiro[(3,5 - dihydroxyboroxin) - 1,1' - (3',5' - dihydroxyboroxin)].

Additional examples of other 2-substituted imidazolidine monoammonium salts of spiro[(3,5 - dihydroxyboroxin)-1,1'-(3',5'-dihydroxyboroxin)] of this invention and the materials used for their preparation (except boric acid) are given in Table VI, below. In the table only the alkenyl, or polyalkenyl, portion of the polyalkenylsuccinic anhydride and the average molecular weight of such portion are given, TEPA means tetraethylenepentamine.

TABLE VI

| Ex. No. | Alkenyl portion of alkenylsuccinic anhydride (mol wt. of alkenyl group) | Poly amine | Urea type compound | Product |
|---|---|---|---|---|
| 58 | Polybutenyl (1,190) | TEPA | Urea | The 1-[8-(polybutenylsuccinimido)-3,6-diazaoctyl]-2-imidazolidinone monoammonium salt of spiro[(3,5-dihydroxyboroxin)-1,1'-(3',5'-dihydroxyboroxin)]. |
| 59 | Polybutenyl (1,350) | TEPA | do | The 1-[8-(polybutenylsuccinimido)-3,6-diazaoctyl]-2-imidazolidinone monoammonium salt of spiro[(3,5-dihydroxyboroxin)-1,1'-(3',5'-dihydroxyboroxin)]. |
| 60 | do | TEPA | Guanidine | The 2-imino-1-[8-(polybutenylsuccinimido)-3,6-diazaoctyl]imidazolidine monoammonium salt of spiro[(3,5-dihydroxyboroxin)-1,1'-(3',5'-dihydroxyboroxin)]. |

The imidazoline portion of the salts of the present invention based upon mono-imidazolines (1) can be represented by the structure $$R-CH-C\overset{O}{\underset{O}{\diagdown}}N-CH_2-\underset{R_1}{\overset{R_1}{C}}-(NH-CH_2-\underset{R_1}{\overset{R_1}{C}})_x-N\diagdown\underset{C}{\overset{CH_2-C-R_1}{|}}\diagup\overset{R_1}{\underset{R_{19}}{N}}$$
$$CH_2-C\overset{O}{\underset{O}{\diagdown}}$$

and based upon bis-imidazolines (m) can be represented by the structure $$\left[R-CH-C\overset{O}{\underset{O}{\diagdown}}N-CH_2-\underset{R_1}{\overset{R_1}{C}}-(NH-CH_2-\underset{R_1}{\overset{R_1}{C}})_x-N\diagdown\underset{C}{\overset{CH_2-C-R_1}{|}}\diagup N\right]_2 T$$

where $R$, $R_1$, $R_{19}$, $x$ and $T$ have their aforedescribed significance. For convenience imidazoline, as used herein, is intended to include both the mono- and bis-imidazolines. The imidazolines can be prepared by reacting (i) a polyalkenylsuccinic anhydride, represented by the structure $$R-CH-C\overset{O}{\underset{O}{\diagdown}}O$$
$$CH_2-C\overset{O}{\underset{O}{\diagup}}$$

or the acid thereof, with (ii) a polyethyleneamine represented by the structure $$H_2N-CH_2-\underset{R_1}{\overset{R_1}{C}}-(NH-CH_2-\underset{R_1}{\overset{R_1}{C}})_x-NH-CH_2-\underset{R_1}{\overset{R_1}{C}}-NH_2$$

to produce
an intermediate product, an imide, represented by the structure $$R-CH-C\overset{O}{\underset{O}{\diagdown}}N-CH_2-\underset{R_1}{\overset{R_1}{C}}-(NH-CH_2-\underset{R_1}{\overset{R_1}{C}})_x-NH-CH_2-\underset{R_1}{\overset{R_1}{C}}-NH_2$$
$$CH_2-C\overset{O}{\underset{O}{\diagup}}$$

which is then reacted with (iii) a carboxylic acid, that is,
(1) a monocarboxylic acid represented by the structure $$R_{19}-\overset{O}{\overset{\|}{C}}-OH$$

or the anhydride thereof, or
(2) a dicarboxylic acid represented by the structure $$HO-\overset{O}{\overset{\|}{C}}-T-\overset{O}{\overset{\|}{C}}-OH$$

or the anhydride thereof, where $R$, $R_1$, $R_{19}$, $x$ and $T$ have their aforedescribed significance. The mol ratios of (i):(ii):(iii) will be about 1:1:1, respectively, to prepare mono-imidazolines and about 2:2:1, respectively, to prepare bis-imidazolines. However, where the acid anhydride (iii) is used in place of the carboxylic acid the mol of (i):(ii):(iii) will be about 1:1:0.5, respectively, in the case of mono-imidazolines and 2:2:0.5, respectively, in the case of the bis-imidazolines. The imidazoline product is then reacted with boric acid using five mols of boric acid per mol of mono-imidazoline or bis-imidazoline.

The polyalkenylsuccinic anhydrides useful in preparing the imidazolines of this invention can be prepared from an olefin, a polymer of a lower olefin or a copolymer of lower olefins and maleic anhydride as aforedescribed. The polyethyleneamines which can be used are those described above with respect to the imidazolidines (a).

In the case of the monocarboxylic acids useful in preparing the mono-imidazoline (1) based salts of this invention, the following are representative:

(a) Aliphatic monocarboxylic acids (i) Where $R_{19}$ is hydrogen, an alkyl or substituted alkyl radical.—Formic acid, acetic acid, fluoroacetic acid, propionic acid, β-chloropropionic acid, butyric acid, isobutyric acid, 2 - nitroisobutyric acid, valeric acid, isovaleric acid, hexanoic acid, heptanoic acid, 2-ethylhexanoic acid, nonanoic acid, decanoic acid, dodecanoic acid, undecanoic acid, tetradecanoic acid, hexadecanoic acid, heptadecanoic acid, octadecanoic acid, eicosanoic acid, docosanoic acid and triacontanoic acid.

(ii) Where $R_{19}$ is an alkenyl or substituted alkenyl radical.—3-butenoic acid, 2-pentenoic acid, 2-hexenoic acid, teracrylic acid, hypogaeic acid, oleic acid, elaidic acid, linoleic acid, α-eleostearic acid, β-eleostearic acid, α-linolenic acid, acrylic acid, β-chloroacrylic acid, methacrylic acid, crotonic acid, isocrotonic acid, angelic acid, senecioic acid and 4-tetradecenoic acid.

(b) Alicyclic monocarboxylic acids

Cyclopropanecarboxylic acid, cyclopentanecarboxylic acid, cyclohexanecarboxylic acid, hydnocarpic acid, chaulmoogric acid, naphthenic acids, 2,3,4,5-tetrahydrobenzoic acid and cyclodecanecarboxylic acid.

(c) Aromatic monocarboxylic acids

Benzoic acid, 1-naphthoic acid, 2-naphthoic acid, o-toluic acid, m-toluic acid, p-toluic acid, o-chlorobenzoic acid, m-chlorobenzoic acid, p-chlorobenzoic acid, 2,3-dibromobenzoic acid, 3,4-dichlorobenzoic acid, o-nitrobenzoic acid, m-nitrobenzoic acid, p-nitrobenzoic acid, 2,3-dinitrobenzoic acid, anisic acid, phenylactic acid and β-phenylpropionic acid.

(d) Heterocyclic monocarboxylic acids

Picolinic acid, nicotinic acid, furylacrylic acid, piperic acid, 3-indoleacetic acid, cinchoninic acid, furoic acid, 2-thiophenecarboxylic acid, 2-pyrrolecarboxylic acid, 9-acridancarboxylic acid, quinaldic acid and pyrazinoic acid.

In the case of the dicarboxylic acids useful in preparing the bis-imidazoline based salts of this invention, the following are representative:

(a) Aliphatic dicarboxylic acids (i) Where T is an alkylene radical.—Oxalic acid, malonic acid, adipic acid, pimelic acid, suberic acid, azelaic acid, sebacic acid, brassylic acid, and thapsic acid.

(ii) Where T is an alkenylene radical.—Maleic acid, fumaric acid, glutaconic acid, citraconic acid, itaconic acid, ethylidenemalonic acid, mesaconic acid, allylmalonic acid, teraconic acid and cetylmalonic acid.

It is also contemplated herein to employ dimeric and trimeric polycarboxylic acids to produce the bis-imidazoline based salts of the present invention. When two like or unlike molecules of a polyethenoid monocarboxylic fatty acid condense to form a dicarboxylic acid, the product by definition is a dimer acid, or the carboxylic acid is said to be dimerized. In general, the dimer acids suitable for use in this invention are produced by the condensation of two like or unlike unsaturated aliphatic monocarboxylic acids having between about 16 and about 18 carbon atoms per molecule, examples of which comprise $\Delta^{9,11}$-hexadecadienoic acid
$\Delta^{9,12}$-heptadecadienoic acid
$\Delta^{8,12}$-octadecadienoic acid
$\Delta^{9,11}$-octadecadienoic acid
$\Delta^{9,12}$-octadecadienoic acid (linoleic acid)
$\Delta^{9,13}$-octadecadienoic acid
$\Delta^{9,11,13}$-octadecatrienoic acid
$\Delta^{9,12,15}$-octadecatrienoic acid (linolenic acid)

To provide a reaction medium and to facilitate the removal of the water of reaction in the preparation of both of the intermediate products, an inert hydrocarbon solvent can be used. Suitable temperatures for preparing the intermediate products at atmospheric pressure are of the order of 80° C. to 220° C., preferably 125° C. to 200° C. The reaction of boric acid and imidazoline can be conducted as previously described using benzene, toluene or hydrocarbon oil as a solvent if desired, at temperatures of the order of 25°–150° C.

A detailed general procedure for preparing the imidazoline-based salts of this invention is as follows:

Into a conventional glass reactor fitted with an agitator, raw material inlet, product outlet, reflux condenser, Dean-Stark trap, heating means and thermometer, containing a polyethyleneamine in a solvent, and with the agitator running, polyalkenylsuccinic anhydride, or acid, is slowly added. The resulting mixture is then heated (125°–200° C.) for about two to three hours while removing water formed by the reaction to produce an imide as described above. The reaction mass is then cooled and a carboxylic acid is added. The resulting mixture is heated (125°–200° C.) for a sufficient time to complete the reaction while simultaneously removing water formed by the reaction. Thereafter boric acid is added and the resulting mixture is heated at 25–150° C. for one hour. Water formed by the reaction can be removed during the heating period or thereafter. Thereafter if benzene or toluene or other volatile solvent is used, it is stripped to leave the desired salt.

A variation of the above preparation can be practiced by adding the polyalkenylsuccinic anhydride, or acid, slowly to the polyamine with mixing and then following the latter addition with a charge of carboxylic acid. A subsequent mixing and heating of the mixture and removing the water formed by the reaction results in the production of the corresponding imidazoline.

Still another variation is to add the polyalkenylsuccinic anhydride, or acid, and the polyamine to the reactor slowly and in carefully regulated stochiometric quantities (that is, in a mol ratio of essentially 1:1, respectively). The mixture can then be heated and the water which is formed then removed. Subsequently the carboxylic acid can be charged to the mixture and heating continued until evolution of water has ceased leaving an imidazoline.

The preparation of specific imidazoline based salts of this invention is illustrated in the following non-limiting examples, wherein parts are parts by weight.

EXAMPLE 61

Into a conventional glass reactor fitted as described above, there is charged 14.5 parts of diethylenetriamine (0.1412 mol) in 50 ml. of toluene. With the agitator running 188.6 parts of polybutenylsuccinic anhydride in 50 ml. of toluene, in which the polyalkenyl group has an average molecular weight of about 980, (0.1412 mol) is slowly charged after which the resulting mixture is heated to about 125° C. (reflux) for about two hours. The by-product water is removed as it is formed by the reaction.

After cooling the reaction mixture from above to about 70° C., 8.5 parts of acetic acid (0.1412 mol) is added. Refluxing is then continued until the evolution of water and its collection has ceased.

The reaction mass is cooled to 80° C. and 149 parts of boric acid is added. The mixture is then heated at about 90–110° C. for about one hour while continuously removing water of reaction. The toluene is then stripped to leave the 1 - [8-(polybutenylsuccinimido)-3,6-diazaoctyl] - 2 - naphthenyl - 2 - imidazoline monoammonium salt of spiro[(3,5 - dihydroxyboroxin)-1,1'-(3',5'-dihydroxyboroxin)].

EXAMPLE 63

In the manner of Example 61, 810 parts of polybutenyl(980)succinic anhydride (0.64 mol) is reacted with 65.9 parts of diethylenetriamine (0.64 mol), 181 parts of oleic acid (0.64 mol) and 198 parts of boric acid (3.2 mols) to provide the 1-[2-(polybutenylsuccinimido) ethyl] - 2 - (heptadec - 8 - enyl)-2-imidazoline monoammonium salt of spiro[(3,5 - dihydroxyboroxin)-1,1'-(3', 5'-dihydroxyboroxin)].

EXAMPLE 64

In the manner of Example 61, 1600 parts of polybutenyl(980)succinic anhydride, 175 parts of triethylenetetramine, 59.2 parts of acetic acid and 372 parts of boric acid are reacted to provide 2 - methyl - 1-[5-(polybutenylsuccinimide) - 3 - azapentyl] - 2 - imidazoline monoammonium salt of spiro[(3,5-dihydroxyboroxin)-1,1'-(3',5'-dihydroxyboroxin)].

EXAMPLE 65

In the manner of Example 61, 169.7 parts of polybutenyl(1368)succinic anhydride is reacted with 18.9 parts of tetraethylenepentamine in toluene. After sufficient reflux with the collection of all the by-product water, the reaction mixture is cooled and 6.0 parts of acetic acid is slowly added. Refluxing is continued until the evolution and collection of water has ceased. The intermediate imidazoline is then reacted with 31 parts of boric acid. After stripping the toluene there remains the 1 - [8 - (polybutenylsuccinimido)-3,6-diazaoctyl]- 2 - methyl - 2 - imidazoline monoammonium salt of spiro[(3,5 - dihydroxyboroxin) - 1,1'-(3',5'-dihydroxyboroxin)].

EXAMPLE 66

An 0.117 mol preparation of 11-[polybutenyl(980) succinimido]-3,6,9-triazaundecylamine is carried out in the usual manner by refluxing a reaction mixture of tetraethylenepentamine (0.117 mol) in toluene and polybutenyl(980)succinic anhydride (0.117 mol) and removing the by-product water as it is formed. After cooling the reaction mixture, 0.117 mol of oleic acid is added and the resulting solution is refluxed with further collection of water being effected until the water has ceased to evolve. The intermediate imidazoline is then reacted with 0.58 mol of boric acid to give the 1-[3-(polybutenylsuccinimido) - 3,6 - diazaoctyl] - 2 - (heptadec - 8 - enyl)- 2 - imidazoline monoammonium salt of spiro[(3,5-dihydroxyboroxin) -1,1'-(3',5'-dihydroxyboroxin)].

Another embodiment of the present invention is to use tall oil and other similar mixtures of acids in place of the carboxylic acid reactant described above. Tall oil is a natural mixture of rosin acids, fatty acids and non-acidic bodies. It is contemplated by the present disclosure to use said tall oil in its more refined form, that is to say, having only the unsaturated fatty acids present while all other substituents have been substantially removed from the tall oil, thus making it suitable for the preparation of imidazolines and, therefore, the monoammonium salts of the present invention.

The following is an example of the use of tall oil in the aforementioned manner.

EXAMPLE 67

Into a suitable reaction vessel, fitted as described above, which contains 170 parts of tetraethylenepentamine in 100 ml. of xylene is charged 1200 parts of polybutenyl- (980)succinic anhydride in 500 ml. of xylene. This reaction mixture is heated to reflux, and maintained at reflux for about three hours with stirring until the evolution and collection of water has ceased. The reaction mixture is then cooled and 253 parts of refined tall oil is added. The refined tall oil had a total fatty acid content of 96.8% by weight; its composition was 48% linoleic acid and 52% oleic acid. The resulting solution is heated and maintained at reflux until further evolution and collection of water has ceased. 278 parts of boric acid is charged and the reaction mass is then heated at about 90° C. for one hour. Water formed in the reaction is then removed by azeotropic distillation. Thereafter, the xylene is removed to leave the 2 - (heptadec - 8-enyl, heptadec - 8,11 - dienyl) - 1-[8-(polybutenylsuccinimido)-3,6 - diazaoctyl] - 2 - imidazoline monoammonium salt of spiro[(3,5 - dihydroxyboroxin)-1,1'-(3',5'-dihydroxyboroxin)].

Additional examples of other salts of this invention based upon imidazolines and the materials used for their preparation (other than boric acid) are given in Table VII, below. In the table only the alkenyl, or polyalkenyl, portion of the polyalkenylsuccinic anhydride and the average molecular weight of such portion are given, TEPA means tetraethylenepentamine.

TABLE VII

| Ex. No. | Alkenyl portion of alkenylsuccinic anhydride (mol wt. of alkenyl group) (a) | Polyethylene polyamine (b) | Carboxylic acid (c) | Molar ratio (a):(b):(c) | Product |
|---|---|---|---|---|---|
| 68 | Polybutenyl(1,368) | TEPA | Picolinic acid | 1:1:1 | The 1-[8-(polybutenylsuccinimido)-3,6-diazaoctyl]-2-(2-pyridyl)-2-imidazoline monoammonium salt of spiro[(3,5-dihydroxyboroxin)-1,1'-(3',5'-dihydroxyboroxin)]. |
| 69 | do | TEPA | Benzoic acid | 1:1:1 | The 1-[8-(polybutenylsuccinimido)-3,6-diazaoctyl]2-phenyl-2-imidazoline monoammonium salt of spiro[(3,5-dihydroxyboroxin)-1,1'-(3',5'-dihydroxyboroxin)]. |
| 70 | Polybutenyl (980) | TEPA | Adipic acid | 2:2:1 | The 2,2'-tetramethylene-1,1'-bis[8-(polybutenylsuccinimido)-3,6-diazaoctyl-2-imidazoline] monoammonium salt of spiro[(3,5-dihydroxyboroxin)-1,1'-(3',5'-dihydroxyboroxin)]. |
| 71 | do | TEPA | Sebacic acid | 2:2:1 | The 2,2'-octamethylene-1,1'-bis[8-(polybutenylsuccinimido)-3,6-diazaoctyl-2-imidazoline] monoammonium salt of spiro[(3,5-dihydroxyboroxin)-1,1'-(3',5'-dihydroxyboroxin)]. |
| 72 | Polybutenyl(1,368) | TEPA | Dimer acid (containing 36 carbons) | 2:2:1 | The 6-hexyl-5-pentyl-4-'10-[1-(8-polybutenylsuccinimido-3,6-diazaoctyl)-2-imidazolin-2-yl]dec-2-enyl'-3-]7-[1-(8-polybutenylsuccinimido-3,6-diazaoctyl)-2-imidazolin-2-yl]heptyl' cyclohexenemonoammonium salt of spiro[(3,5-dihydroxyboroxin)-1,1'-(3',5'-dihydroxyboroxin)]. |

Additional groups of materials which are also useful in lubricating oils, fuel oils and gasoline compositions as ashless or non-metallic detergents, rust inhibitors and antioxidants are obtained by reacting boric acid, or a compound which gives boric acid in the presence of water, such as boric oxide, or other boron acids, e.g., metaboric acid, moron halides and esters of boron acids, with intermediate reaction products formed by the interaction of (i) an alkenylsuccinic anhydride, represented by the structure

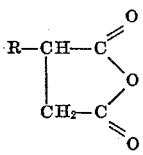

or the acid thereof, (ii) a polyethyleneamine, represented by the structure

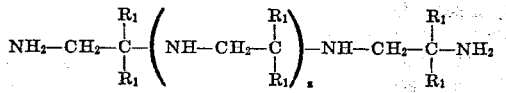

and (iii) a compound selected from
 (a) a carbonyl-containing compound selected from
  (1) aldehydes and ketones represented by the structure

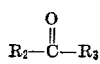

(2) dialdehydes and diketones represented by the structure

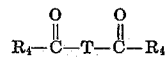

(b) a carbonyl-containing aromatic or heterocyclic compound, represented by the structure

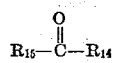

(c) urea, thiourea or guanidine represented by the structure

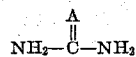

and (d) a carboxylic acid, that is,
 (1) a monocarboxylic acid represented by the structure

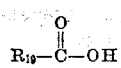

or the anhydride thereof, or (2) a dicarboxylic acid represented by the structure

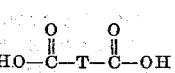

or the anhydride thereof, where $R$, $R_1$, $R_2$, $R_3$, $R_4$, $R_{14}$, $R_{15}$, $R_{19}$, $T$, $A$ and $z$ have their aforedescribed significance, in mol ratios of (i):(ii) of about 1:1 to about 1.6:1 preferably about 1.1:1 to about 1.4:1, respectively, mol ratios of (ii):(iii) of from about 1:0.8 to 1:1.2, preferably about 1:1, respectively, and mol ratios of boron compound to (ii) of from about 0.1:1 to about 25:1, respectively. The maximum amount of a boron compound used can also be expressed as five mols per gram atom of basic nitrogen in the intermediate reaction product. The number of gram atoms of basic nitrogen can be determined by a standard perchloric acid titration of such intermediate using a crystal violet indicator. The products containing 1 to 10 mols of boron compound per mol of (ii), which in the case of products formed from a dicarboxylic acid is 0.5 to 5 mols per mol of (ii), are preferred. For convenience boric acid will generally be referred to as the boron compound used. It is to be noted that the mol ratios of reactants (i), (ii) and (iii) expressed above represent total quantities of such reactants and that in preparing the contemplated reaction products the order of reaction is not critical and the reactants can be utilized in portions, that is, portions of the total quantity of reactants (i), (ii) and (iii) to be used can be reacted together in any order. Also an inert hydrocarbon can be used as a reaction medium. It is also preferred to conduct the process with agitation.

All of the reactants designated (i), (ii) and (iii), (a), (b), (c) and (d) have been described above and accordingly need no further description.

The amount of excess alkenylsuccinic anhydride used (relative to the polyethyleneamine) in preparing such products is important since large excesses above about 60% cause an increase in lacquer deposits resulting in a product which is less acceptable. Accordingly, the amount of excess alkenylsuccinic anhydride should range from more than 0% up to about 60%. Engine test experience with the various products encompassed by this invention has shown that the amount of such excess is preferably from about 10% to about 40%.

The amount of excess or deficiency of reactant (iii) relative to the polyethyleneamine (ii) can vary from a mol ratio of 1:1.2 to 1:0.8, respectively. [In the case of acid anhydrides (iii)(d) one-half mol of anhydride is equivalent to one mol of acid.] However, mol ratios of about 1:1 are preferred.

In preparing the reaction products of this invention, the temperatures of reaction before addition of boric acid can be in the range of 0–200° C., preferably 100–190° C., at atmospheric, superatmospheric or reduced pressure. The raw materials (i), (ii) and (iii) can be reacted in indifferent order and in portions as is more fully illustrated in the following examples. Thereafter boric acid is added and the resulting mixture heated at temperatures of 25–200° C., thereby forming the desired reaction products. The preparation of the reaction products of this invention using (i) an alkenylsuccinic anhydride, (ii) a polyethyleneamine, a compound of class (iii) and a boron compound is illustrated in the following non-limiting examples wherein parts are parts by weight.

EXAMPLE 73

Into a reaction vessel containing, at 5° C., 16.1 parts of triethylenetetramine (0.11 mol) in process oil, there is slowly charged 4.85 parts of acetaldehyde (0.11 mol) causing the temperature to rise to 14° C. followed by the addition of 220 parts of polybutenylsuccinic anhydride (0.1321 mol) having a polybutenyl group with an average molecular weight of about 1350. The resulting mixture is then heated, under vacuum, to about 150° C. and held at that temperature for about forty minutes at a pressure of 35 mm. of Hg during which time the water of reaction is removed. After allowing the reaction mass to cool to about 70° C., 34 parts of boric acid (0.55 mol) and 3 ml. of water is added and the resulting mixture is heated, with agitation, at 90° C. for about one hour followed by heating at 150° C. and 35 mm. of Hg for forty-five minutes. The reaction mass is then filtered to provide the desired reaction product which analyzes 1.38% total nitrogen and 1.35% boron. The B/N atom ratio is 1.26.

EXAMPLE 74

Into the reaction vessel containing 28.3 parts of tetraethylenepentamine (0.1493 mol) in toluene is slowly added 3.28 parts of acetaldehyde (0.0746 mol), followed by 309 parts of polybutenylsuccinic anhydride (0.1792 mol: the average molecular weight of the alkenyl group is 1315) in toluene and then an additional 3.28 parts of acetaldehyde. The resulting mixture is then heated at reflux (123° C.) for three hours while removing water formed in the reaction. Thereafter the toluene is removed to leave 337 parts of a reaction product which is diluted with mineral oil. Water and 19.1 parts of boric acid (0.309 mol) are then charged and the reaction mass heated at about 90° C. for one hour. Thereafter the water is removed as in Example 73 to leave the desired reaction product which analyzes 0.54% boron and 1.72% nitrogen. The B/N atom ratio is 0.4.

EXAMPLE 75

Into a suitable reaction vessel there is charged 12.2 parts of triethylenetetramine (0.0834 mol), 80.4 parts process oil and 6.0 parts of butyraldehyde (0.0834 mol). During the addition of the butyraldehyde the reaction mass temperature is kept below 30° C. Thereafter there is added 145 parts of polybutenylsuccinic anhydride (0.1 mol) in which the polybutenyl group has an average molecular weight of 980 and the resulting mixture is heated to and held at 150° C. with a system pressure of 35 mm. of mercury for one hour while continuously removing water of reaction. 30.0 parts of boric acid (0.487 mol) is then added along with 1.5 ml. of water and the reaction mass heated at 90° C. for 45 minutes followed by heating for one hour at 150° C. and a pressure of 35 mm. of mercury during which by-product water is removed. The resulting product is then filtered to provide the desired reaction product which analyzes 1.68% nitrogen and 1.45% boron. The B/N atom ratio is 1.12.

EXAMPLE 76

Into a reaction vessel containing 22.8 parts of tetraethylenepentamine in toluene (0.1205 mol) there is slowly charged 12.1 parts of glutaraldehyde (0.0301 mol) followed by the addition of 245 parts of polybutenylsuccinic anhydride (0.1447 mol: the alkenyl group has an average molecular weight of 1368) in toluene and then an additional 12.1 parts of glutaraldehyde. The resulting mixture is then heated at reflux for three hours, while removing water formed in the reaction. Thereafter 37.4 parts of boric acid are chaged and the reaction mixture is heated at about 85° C. for about forty-five minutes. The water is then removed by azeotropic distillation, toluene is stripped under vacuum, process oil is added and the resulting mixture is filtered to leave the desired product.

EXAMPLE 77

Into a suitable reaction vessel containing 14.2 parts of tetraethylenepentamine (0.0749 mol) in 70 ml. of toluene, there is added, with stirring, 4.35 parts of acetone (0.0749 mol). After heating the resulting mixture to about 100° C., 150 parts of polybutenylsuccinic anhydride (0.09 mol: the alkenyl group has an average molecular weight of 1368) in toluene is added. The resulting mixture is refluxed for about two and one-half hours while removing water formed in the reaction. The intermediate reaction product is then reacted with 23.2 parts of boric acid (0.37 mol) in the usual manner to provide the desired reaction product.

EXAMPLE 78

Into a suitable reaction vessel containing 10.85 parts of chloral (0.0738 mol) there is added 13.98 parts of tetraethylenepentamine (0.0738 mol) in toluene, which is followed by the addition of 148 parts of the same polybutenylsuccinic anhydride used in Example 77 (0.0885 mol) in toluene and the resulting mixture is heated at reflux until no additional water of reaction can be removed. The toluene is then stripped under vacuum and the product diluted with oil. The diluted product is then reacted with 23 parts (0.37 mol) of boric acid in the usual manner to provide the desired reaction product.

EXAMPLE 79

In the manner of Example 75, 37.2 parts of tetraethylenepentamine (0.197 mol), 14.2 parts of butyraldehyde (0.197 mol) and 500 parts of polybutenylsuccinic anhydride (0.275 mol) having an alkenyl group of average molecular weight 1350, are reacted in 243 parts of process oil to yield an intermediate reaction product which is in turn reacted with 60.8 parts of boric acid (0.982 mol) in the usual manner to provide the desired reaction product having good detergent properties.

EXAMPLE 80

In the manner of the previous example 32.5 parts of tetraethylenepentamine (0.172 mol), 12.4 parts of butyraldehyde (0.172 mol), 500 parts of polybuteneylsuccinic anhydride (0.275 mol) and 53.4 parts of boric acid (0.86 mol) are reacted to provide the desired reaction product having good detergent properties.

EXAMPLE 81

In the general manner of Example 75, 4.33 parts of tetraethylenepentamine (0.229 mol), 21.1 parts of furfural (0.229 mol) and 500 parts of polybutenylsuccinic anhydride (0.275 mol) in which the alkenyl group has an average molecular weight of 1350 are reacted, in oil, to provide an intermediate reaction product which is then reacted with 70.9 parts of boric acid (1.14 mol) in the presence of 10 ml. of water to provide the desired product which analyzes 1.85% nitrogen and 1.4% boron and has good detergent properties.

EXAMPLE 82

Into a suitable reaction vessel, fitted as previously described, and containing 26.3 parts of tetraethylenepentamine (0.1387 mol) in toluene, there is charged 7.36 parts of benzaldehyde (0.0693 mol). A slight temperature rise is noted. Then 287 parts of polybutenylsuccinic anhydride (0.1665 mol: the average molecular weight of the alkenyl group is 1315) in toluene is slowly added. Again some heat evolution is noted. After completing the anhydride addition, an additional 7.36 parts of benzaldehyde is charged and the resulting mixture is heated at reflux (about 125° C.) for about three hours while continuously removing water formed in the reaction.

After cooling the reaction mass to about 85° C., 43 parts of boric acid is added and the resulting mixture is heated at 95–110° C. for about two hours while removing water as it is formed. The toluene is then stripped and the product diluted with oil.

EXAMPLE 83

Into a suitable reaction vessel, fitted as previously described, and containing 1520 parts of polybuteneylsuccinic anhydride (1.2 mol: the average molecular weight of the alkenyl group is 980) in toluene, there is charged 189 parts of tetraethylenepentamine (1.0 mol) and the mixture is refluxed until the evolution and collection of water ceases. The toluene is then stripped and 60 parts of urea (1.0 mol) along with 858 parts of process oil are charged to the reaction mixture. Heating is continued at 180–190° C. until the evolution of ammonia has ceased to provide the desired intermediate product.

After cooling the reaction mixture 310 parts of boric acid (5.0 mol) is charged and the resulting mixture heated at 90° C. for about one hour. The pressure is reduced to 30 mm. of Hg and the reaction mass heated at 150° C. for one hour while the water of reaction is removed. The mixture is then filtered to leave an oil solution of the desired reaction product.

EXAMPLE 84

Example 83 is repeated except that only 1.1 mol of polybutenylsuccinic anhydride is employed and 1.0 mol of thiourea is used in place of the urea. The product is a good detergent for use in lubricating oils.

EXAMPLE 85

Into a suitable reaction vessel, fitted as previously described, containing 94.5 parts of tetraethylenepentamine (0.5 mol) in toluene there is charged 895 parts of polybuteneylsuccinic anhydride (0.7 mol: the average molecular weight of the alkenyl group is 980). The reaction mixture is refluxed until the evolution and collection of water has ceased and then the toluene is stripped off. Subsequently, 30 parts of urea (0.5 mol) and 488 parts of process oil is added to the reaction mixture. The mixture is then heated at 170–180° C. until the evolution of ammonia has ceased.

The reaction mass is then cooled to 70° C. and 157.3 parts of boric acid (2.5 mol) is charged. The resulting mixture is then heated at 90° C. for about one hour and then at 150° C. and a total pressure of 30 mm. of Hg for one hour. The reaction mass is then filtered to leave an oil solution of the desired reaction product.

EXAMPLE 86

Into a suitable reaction vessel containing 171 parts of polybutenylsuccinic anhydride having an alkenyl group of an average molecular weight of about 980 and about 40 ml. of toluene, at 40° C., there is added 18.9 parts of tetraethylenepentamine and 8.9 parts of guanidine carbonate. The temperature of the reaction mixture is then increased to about 130° C. and held at 130–150° C. for about twelve hours while continuously removing water as it is formed. (The evolution of carbon dioxide occurs when the guanidine carbonate is added and during the heat-up period.) The reaction mass is then cooled to about 70° C. and 17.4 parts of boric oxide and 7 ml. of water are charged. The resulting mixture is then heated at 80° C. for about one and one-half hours and then the water is removed by azeotropic distillation. The toluene is then stripped and the remaining mass diluted with oil and filtered to provide an oil solution of the desired product.

EXAMPLE 87

Into a suitable reaction vessel, fitted as previously described, and containing 73 parts of triethylenetetramine (0.5 mol) in toluene there is charged 1080 parts of polybutenylsuccinic anhydride (0.6 mol: the average molecular weight of the alkenyl group is 1350). The reaction mixture is refluxed until the evolution and collection of water has ceased and then the toluene is stripped. 30 parts of urea (0.5 mol) along with 570 parts of process oil are added followed by heating the mixture at 180–190° C. until the evolution of ammonia has ceased. The reaction mass is cooled to 70° C. and 157.3 parts of boric acid (2.5 mol) is then charged. The resulting mixture is heated at 90° C. for about one hour and then 150° C. and 30 mm. of Hg total pressure for one hour. The product is then filtered to leave the desired reaction product in oil.

EXAMPLE 88

Into a suitable reaction vessel containing 22.9 parts of tetraethylenepentamine (0.1208 mol) and 75 ml. of toluene, there is slowly added 17.0 parts of oleic acid (0.0604 mol). After completing the addition of the oleic acid there is added rapidly 250 parts of polybutenylsuccinic anhydride in which the polybutenyl group has an average molecular weight of 1350 (0.145 mol) followed by the addition of 17.1 parts of oleic acid. The reaction mass is then heated to 150° C. and held at 150° C. for three hours, after which the toluene is removed. The resulting product is diluted with oil and is heated with 18.7 parts of boric acid (0.302 mol) and 4 ml. of water at 90° C. for about 30 minutes. Thereafter the system pressure is reduced to 35 mm. of mercury and the reaction mass is heated at 150° C. until the flow of by-product water has ceased. The reaction mass is then filtered to provide the desired reaction product, which analyzes 0.62% boron and 1.46% nitrogen. The B/N atom ratio is 0.55.

EXAMPLE 89

To a suitable reaction vessel containing 17.33 parts of tetraethylenepentamine (0.0916 mol) in process oil there is rapidly added 9.71 parts of benzaldehyde (0.0916 mol), followed by the addition of 183 parts of polybutenylsuccinic anhydride (0.1098 mol: the polybutenyl group has an average molecular weight of 1350) in process oil. The resulting mixture is heated to 110° C. and then cooled to about 85° C. Then 20.3 parts of boric acid (0.328 mol)

is charged and the resulting mixture heated to and maintained at 90° C. for about 10 minutes at a slight vacuum, after which the reaction mass is heated at 150° C. with a system pressure of 35 mm. of mercury for approximately one hour. The reaction mass is then filtered to yield the desired reaction product which analyzes 0.61% boron and 1.32% nitrogen. The B/N atom ratio is 0.60.

EXAMPLE 90

The procedure of the previous example is repeated except that only 12.15 parts of boric acid (0.1967 mol) is used to give a product analyzing 0.20% boron and 1.69% nitrogen. The B/N atom ratio is 0.153.

EXAMPLE 91

To a suitable reaction vessel containing 23.0 parts of tetraethylenepentamine (0.1215 mol) and 75 ml. toluene, there is added 6.4 parts of benzaldehyde (0.0607 mol) followed by the addition of 247 parts of polybutenylsuccinic anhydride (0.1458 mol) in which the polybutenyl group has an average molecular weight of 1190 in 90 ml. of toluene. Thereupon an additional 6.4 parts of benzaldehyde is charged and the reaction mixture is heated at reflux while removing water of reaction. After heating the reaction mixture for about two and one-half hours at reflux the toluene is removed to leave 280 parts of product, which is diluted with 140 parts of process oil. To 405 parts of the above-prepared product there are added 39.3 parts of boric acid (0.636 mol) and 4 ml. of water. The resulting mixture is heated at 90° C. for about 35 minutes and then heated to 150° C. with a system pressure of 35 mm. of mercury to remove water of reaction. The resulting product is then filtered to provide the desired reaction product which analyzes 1.42% boron and 1.78% nitrogen. The B/N atom ratio is 1.03.

EXAMPLE 92

The previous example is repeated except that the amount of boric acid charged is varied so that the resulting product analyzes 0.71% boron and 1.59% nitrogen and has a B/N atom ratio of 0.58.

EXAMPLE 93

To a suitable reaction vessel there are charged in the following order 27.9 parts of tetraethylenepentamine (0.1477 mol), 7.8 parts of benzaldehyde (0.0788 mol), 300 parts of polybutenylsuccinic anhydride (0.177 mol) in which the polybutenyl group has an average molecular weight of 1350, 7.8 parts of benzaldehyde and 174 parts process oil. The resulting mixture is heated at 150° C. and a total pressure of 30 mm. of Hg for about two hours and then cooled to 85° C. After cooling, 28.0 parts of boric acid (0.436 mol) and 4.5 ml. of water are charged and the resulting mixture heated to 90° C. for about one hour and then at 150° C. and 30 mm. of Hg for one hour. The reaction mass is then filtered to give an oil solution of the desired product which analyzes 0.82% boron and 1.78% nitrogen. The B/N atom ratio is 0.597.

EXAMPLE 94

In the manner of Example 93, a product is prepared containing 1.36% boron and 1.80% nitrogen. The B/N atom ratio is 0.98.

EXAMPLE 95

To a suitable reaction vessel there is charged 159.8 parts of triethylenetetramine (1.092 mol) and 500 parts process oil, followed by the addition of 115.9 parts of benzaldehyde (1.092 mol) which causes the temperature of the reaction mass to rise about 20° C. Next there is charged 1900 parts of polybutenylsuccinic anhydride (1.310 mol) in which the polybutenyl group has an average molecular weight of 980 and 566 parts of process oil. The reaction mixture is then heated for one and one-half hours at 150° C. and a system pressure of 35 mm. of mercury while removing water of reaction. Thereafter 2424 parts of the reaction product prepared above is combined with 320.5 parts of boric acid (5.19 mol) and 24 ml. of water and the resulting mixture heated at 90° C. for about 30 minutes. The system is then evacuated to a total pressure of 35 mm. of mercury. The reaction mass is then heated at 150° C. for about one hour while removing water of reaction. The resulting product is then filtered to yield the desired reaction product which analyzes 1.28% boron and 1.69% nitrogen. The B/N atom ratio is 1.4.

EXAMPLE 96

To a suitable reaction vessel containing a slurry of 12.2 parts of triethylenetetramine (0.0834 mol) in process oil, there is charged 6.0 parts of butyraldehyde (0.0834 mol). Then 145 parts of polybutenylsuccinic anhydride (0.1 mol) having a polybutenyl group with an average molecular weight of 980 in process oil is added rapidly and the resulting mixture is heated to and maintained at 150° C. and a system pressure of 40–50 mm. of mercury for about one hour while removing the water of reaction. The reaction mixture is then cooled to about 80° C. and 25.9 parts of boric acid (0.417 mol) and 3 ml. of water are added. The reaction mixture is then heated at about 90° C. for about two hours and then at about 150° C. and a system pressure of 50 mm. of mercury for about one hour during which water of reaction is removed. Filter aid is then added and the reaction mixture filtered to provide the desired reaction product which contains 1.52% boron and 1.66% nitrogen. The B/N atom ratio is 1.14.

EXAMPLE 97

Following the general procedure of the previous example, 6.0 parts of butyraldehyde, 12.2 parts of triethylenetetramine and 167 parts of polybutenylsuccinic anhydride in which the polybutenyl group has an average molecular weight of 1350 are reacted to form an intermediate product which is in turn reacted with 25.8 parts of boric acid to provide the desired reaction product which analyzes 1.29% boron and 1.50% nitrogen. The B/N atom ratio is 1.11.

EXAMPLE 98

To a suitable reaction vessel there is charged 240 parts (0.159 mol) of 11-(polybutenylsuccinimido)-3,6,9-triazaundecylamine in which the polybutenyl group has an average molecular weight of 980, process oil and 11.5 parts of butyraldehyde (0.159 mol) and the resulting mixture is heated at 150° C. and 35 mm. of mercury for about two hours while removing water of reaction. The reaction mass is then cooled to about 75° C. and 39.3 parts of boric acid (0.636 mol) is added. The resulting mixture is then heated at 90° C. for about one hour and then 150° C. and 30 mm. of Hg for one hour during which water of reaction is removed. Filter aid is then added and the reaction mass filtered to provide the desired product, which analyzes 3.21% nitrogen and 2.15% boron. The B/N atom ratio is 0.87.

EXAMPLE 99

An intermediate reaction product is prepared by heating together at reflux a toluene solution of 262 parts of polybutenylsuccinic anhydride (0.1912 mol) in which the polybutenyl group has an average molecular weight of 980, 32.9 parts of tetraethylenepentamine (0.1738 mol), and 12.5 parts of butyraldehyde (0.1738 mol). From the foregoing there is obtained 301 parts of an intermediate reaction product in toluene. 225 parts of the intermediate reaction product is diluted with oil, after which 200 ml. of toluene and 50.6 parts of boric acid (0.390 mol) are charged. The resulting mixture is then heated at about 95–120° C. for about one hour while removing water of reaction by azeotropic distillation. Thereafter the reaction mixture is filtered and the toluene removed by distillation to leave an oil solution of the desired reaction product, which analyzes 1.73% nitrogen and 1.83% boron. The B/N atom ratio is 1.37.

EXAMPLE 100

A large quantity of boron-free reaction product is prepared in the manner of the previous example except that a 20% molar excess of polybutenylsuccinic anhydride [(i):(ii) ratio of 1.2:1] is used. 402 parts of such a reaction product is then placed in a suitable reaction vessel and the toluene is removed by distillation to provide 284 parts of solvent-free material to which is added 28.1 parts of boric acid, 3 ml. of water and 142 parts of process oil. The reaction mass is then heated at 90° C. for about 30 minutes and then the temperature is raised to 150° C. and the system pressure reduced to 35 mm. of mercury. Heating is continued at the latter conditions for approximately one hour. The resulting reaction product is then filtered and found to analyze 0.96% boron and 1.82% nitrogen. The B/N atom ratio is 0.60.

EXAMPLE 101

In a manner similar to the above example, 361.5 parts of solvent and boron-free intermediate is reacted with 23.8 parts of boric acid in oil to provide a product which analyzes 0.60% boron and 2.02% nitrogen. The B/N atom ratio is 0.385.

EXAMPLE 102

Initially a large quantity of intermediate boron-free reaction product is prepared from polybutenylsuccinic anhydride in which the molecular weight of the polybutenyl group averaged 1350, tetraethylenepentamine and butyraldehyde, the mol ratio of these reactants being 1.2:1:1, respectively. The intermediate product is prepared by adding the butyraldehyde to a toluene solution of tetraethylenepentamine, followed by the addition of a toluene solution of the polybutenylsuccinic anhydride. The reaction mass is then warmed to 90° C. followed by the addition of the other half of the butyraldehyde to be used and the resulting mixture is heated at reflux for about two hours, after which the system is placed under vacuum and the toluene removed.

(a) 359 parts of an oil solution of the above-prepared boron-free reaction product containing 0.200 gram atoms of basic nitrogen is reacted with 9.24 parts of boric acid (0.149 mol) by heating the reaction mixture at 90° C. for about 30 minutes, followed by heating at 150° C. and a system pressure of 35 mm. of mercury until essentially all water of reaction is removed, followed by the usual filtration step. The product analyzes 0.36% boron and 1.49% nitrogen. The B/N atom ratio is 0.313.

(b) 352 parts of an oil solution of the above-prepared boron-free reaction product containing 0.293 gram atoms of basic nitronen is reaction with 18.2 parts of boric acid (0.293 mol) in the same manner as in (a) to provide a reaction product which analyzes 0.78% boron and 1.54% nitrogen. The B/N atom ratio is 0.65.

(c) 315 parts of an oil solution of the above-prepared boron-free reaction product containing 0.263 gram atoms of basic nitrogen is reacted with 24.4 parts of boric acid (0.3938 mol) in the same manner as in (a) above to provide a reaction product which analyzes 1.17% boron and 1.54% nitrogen. The B/N atom ratio is 0.98.

(d) 497 parts of an oil solution of the above-prepared boron-free reaction product is reacted with 46.8 parts of boric acid (0.759 mol) in the same manner as in (a) above to provide a product which analyzes 1.42% boron and 1.63% nitrogen. The B/N atom ratio is 1.12.

EXAMPLE 103

Into a suitable reaction vessel containing 30.9 parts of tetraethylenepentamine (0.1633 mol) in toluene there is slowly added 11.8 parts of butyraldehyde (0.1633 mol). The reaction mixture is kept at about 15° C. during the addition of the butyraldehyde. Thereafter with rapid agitation a solution of 338 parts of polybutenylsuccinic anhydride (0.196 mol: the polybutenyl group has an average molecular weight of 1350) in toluene is added rapidly and the resulting mixture heated at reflux (122° C.) several hours while removing water of reaction. The toluene is then removed by vacuum distillation to provide 374 parts of intermediate product which is then diluted with 187 parts of process oil.

A small sample of the above prepared product is removed for analysis to leave 503 parts of diluted product which is then heated with 30.2 parts of boric acid (0.489 mol) and 5 ml. of water at 90° C. for about 30 minutes. The temperature of the reaction mass is carefully raised to 150° C. while at the same time reducing the system pressure to 35 mm. of mercury. Heating is then continued at the latter conditions until essentially all water of reaction has been removed. The reaction product is then filtered and found to contain 0.76% boron and 1.5% nitrogen. The B/N atom ratio is 0.65.

EXAMPLE 104

Into a suitable reaction vessel, fitted as previously described, and containing 118.2 parts of tetraethylenepentamine (0.624 mol) in process oil, there is slowly charged 45.0 parts of butyraldehyde (0.624 mol). Polybutenylsuccinic anhydride, 1250 parts (0.749 mol: the average molecular weight of the alkenyl group is 1350) in process oil is then slowly added. After completing the anhydride addition, the resulting mixture is heated at about 150° C. and 35 mm. Hg for about two hours while continuously removing water formed in the reaction to provide an intermediate reaction product.

The reaction mass is then cooled to about 85° C. and 205 parts of boric acid (3.25 mols) and 20 ml. of water are added and the resulting mixture is heated at 90° C. for about forty-five minutes. The reaction mass temperature is then raised to about 150° C. and the pressure is reduced to about 35 mm. of Hg in order to remove water. The 150° C. temperature and reduced pressure are maintained for about one and one-quarter hours and the reaction mixture is then filtered to leave the desired product, which analyzes 1.23% boron and 1.55% total nitrogen. The B/N atom ratio is 1.02.

EXAMPLE 105

In the manner of Example 104, and utilizing the same reactants, 150 parts of an intermediate reaction product is prepared which contains 0.125 gram atoms of basic nitrogen. After cooling the intermediate to about 85° C., 38.8 parts of boric acid (0.626 mol) and 3 ml. of water are charged. The resulting mixture is then heated at 90° C. for one hour after which the temperature is increased to 150° C. over a period of about twenty-five minutes. The reaction mass is then held at 150° C. for about one hour during which time the system total pressure is lowered to 20 mm. of Hg (water is removed during the heating period when the temperature is above 100° C.). Heating is then discontinued, 77 parts of process oil is added (resulting in a 50% solution of reaction product in oil) and the mixture filtered to leave an oil solution of the desired product which analyzes 2.47% boron and 1.03% total nitrogen. The B/N atom ratio is 3.14.

EXAMPLE 106

Into a suitable reaction vessel, fitted as previously described, and containing 11.9 parts of tetraethylenepentamine (0.063 mol) in mineral oil, there is charged 4.5 parts of butyraldehyde (0.063 mol). The temperature of the reaction mass is then increased to 150° C. During the heat-up period 135 parts of polybutenylsuccinic anhydride is charged (0.076 mol: the average molecular weight of the polybutenyl group is 1315). After completing addition of the anhydride, the pressure within the reaction vessel is reduced to 25 mm. of Hg and heating at 150° C. is continued for about and one-half hour. The reaction mass is then cooled to 125 C. and 19.5 parts of boric acid (0.32 mol) is charged. The reaction mass is then heated at 150° C. and a pressure of 25 mm. of Hg for an additional two hours during which time water of reaction is removed by distillation. Filter aid is then added and the reaction mass filtered to provide the desired reaction product which analyzes 1.52% boron and 1.97% nitrogen. The B/N atom ratio is 1.00.

EXAMPLE 107

Into a suitable reaction vessel, fitted as previously described, and containing 193.6 parts of pentaethylenehexamine (0.833 mol), there is slowly charged 60.1 parts of butyraldehyde (0.833 mol) followed by 500 parts of process oil. The reaction mass is kept at 20–30° C. during addition of butyraldehyde. 1888 parts of polybutenylsuccinic anhydride (1.0 mol), in which the polybutenyl group has an average molecular weight of 1315, is then added and the resulting mixture heated at 150° C. and a pressure of 25 mm. of Hg for one and one-half hours during which water of reaction is removed. The reaction mass is then cooled to 85–90° C. and 257.8 parts of boric acid (4.165 mol) and 23 ml. of water are charged. The resulting mixture is then heated at 90° C. for thirty minutes, 95° C. for thirty minutes, 100° C. for thirty minutes and 150° C. and 25 mm. of Hg pressure for one hour during which water is removed. An additional 645.7 parts of process oil is added and the resulting mixture filtered to provide an oil solution of the desired reaction product which analyzes 1.95% nitrogen and 1.17% boron. The B/N atom ratio is 0.78.

The effectiveness of the aforedescribed reaction products of this invention to impart low temperature detergent properties is illustrated by the results obtained with such products in a bench scale detergency test, referred to herein as the "Lacquer Deposition Test." The Lacquer Deposition Test involves passing burned gasoline fumes through a sample of an oil formulation containing a product of this invention, in a suitable container, under controlled conditions of flow rates and temperature (285° C.) after which the sample is aged in an oven held at 110° C. The amount of deposit is then determined by washing away the oil with hexane. A control formulation is run simultaneously. The difference in the amount of deposits present when no test product is present less the amount of deposits present when a test product is present is reported as the percent reduction in deposits.

Following the procedure for the Lacquer Deposition Test (LTD) given above selected examples of the above-described reaction products were tested for their detergency effectiveness. The results observed are reported in Table IX, below.

TABLE IX

| Product tested (Example No.) | Concentration, percent by Weight | Lacquer deposition, percent reduction | Product tested (Example No.) | Concentration, percent by Weight | Lacquer deposition, percent reduction |
|---|---|---|---|---|---|
| 73 | 1 | 91 | 99 | 2 | 99 |
| 74 | 1 | 95 | 99 | 1 | 65 |
| 88 | 1 | 81 | 100 | 1 | 65 |
| 89 | 1 | 97 | 101 | 1 | 54 |
| 90 | 1 | 97 | 102 | 1 | 88 |
| 91 | 1 | 91 | 102(a) | 1 | 98 |
| 92 | 1 | 95 | 102(b) | 1 | 97 |
| 93 | 1 | 93 | 102(c) | 1 | 96 |
| 94 | 1 | 91 | 102(d) | 1 | 86 |
| 95 | 1 | 75 | 103 | 1 | 92 |
| 96 | 1 | 28 | 104 | 1 | 91 |
| 97 | 1 | 90 | 105 | 1 | 87 |
| 98 | 2 | 85 | 107 | 1 | 98 |

From the above results several conclusions can be made with regard to the reaction products of this invention. Thus, it is evident that while all the products contemplated herein are useful as detergents, it is also evident that some products are considerably more effective than others. For example, the results of the LDT show that at essentially the same boron to nitrogen atom ratio (B/N) merely increasing the chain length or molecular weight of the polyalkenyl group from 980 to 1350 gives a significant increase in detergency effectiveness of the product of Example 100 with the product of Example 102(b) and the product of Example 96 with the product of Example 97.

The results of the LDT also show that wide variations in boron content or B/N atom ratio have essentially no effect on detergency effectiveness (as measured by the LDT). Thus, note that almost doubling the B/N atom ratio has little effect on detergency effectiveness; compare the LDT results of the products of Example 100 with Example 101; and compare the LDT results of the products of Examples 102(a) (B/N=0.313), (b) (B/N=0.65), (c) (B/N=0.98) and (d) (B/N=1.12). Also note the LDT result of the product of Example 105 (B/N=3.14). Such results are readily understandable when it is realized that the LDT is only designed to measure detergency and, therefore, so long as the amount of boron used is not so great as to cause an oil solubility problem boron content has little or no effect on low temperature detergency as measured by the LDT. The role of boron, in the products of this invention, is, as will be hereinafter shown, to provide improved high temperature detergency and anti-rust protection.

The LDT results also show that improvements in detergency effectiveness are realized by using a molar excess of polyalkenylsuccinic anhydride (compared to polyethyleneamine) in preparing the instant products. Thus, for example, compare the LDT results of Example 98 (no excess) with Example 99 (10% excess).

Other observations which can be made are that when using the higher molecular weight polyalkenylsuccinic anhydrides, highly effective detergents can be obtained even with products containing relatively low amounts of boron (compare the LDT results of Examples 89 and 90) and that as the molecular weight of the polyalkenyl group is decreased higher amounts of boron cause a decrease in detergency (compare the LDT results of Examples 96 and 97). Also a comparison of the procedure used to prepare the product of Example 89 and its LDT results with the procedure used to prepare the product of Example 93 and its LDT results shows that the order in which the reactants are utilized is not critical to the production of reaction products which have good detergent properties. This is also shown by comparing the LDT results of the products of Examples 103 and 104 with the LDT results of the products of Examples 102(b) and (d).

Further evidence of the usefulness of the new products of this invention in lubricating oils is shown by the results obtained in full-scale engine tests of lubricating oil formulations containing such products. The tests utilized include those known as the Engine Test Sequences for Evaluating Oils for API Service MS (1963) (Sequences I, II, III and V), and the Caterpillar CRC-L-1, Supplement 1, engine test.

Sequences I, II and III measure the ability of a lubricant to properly lubricate and protect an engine operating under conditions likely to cause scuffing, wear, rusting, deposit formation and high-temperature oil deterioration. The engine used for these sequences is a 1960 Oldsmobile V-8 and accordingly these test sequences are often referred to as the Oldsmobile test. Specifically, Sequence I is designed to measure low-temperature, medium-speed scuffing; Sequence II is designed to measure low-temperature rusting and deposits; and Sequence III is designed to measure high-temperature oxidation. On completion of the test (all sequences) the engine is disassembled and inspected for scuffing, wear, rusting, corrosion and sludge and varnish deposition. Ratings are reported for the effect of the test additive on these problems at various locations in the engine. All values reported (Table X) in this test are based on a 0–10 scale, with a rating of 10 being the best rating obtainable.

Sequence V is designed to measure the ability of a lubricant to prevent or reduce engine deposits produced by low- and medium-temperature operating conditions. In this sequence, which places emphasis on the antisludging, anticlogging and insolubles suspension characteristics of a lubricant, a 1957 Lincoln-Mercury ECU engine is used and accordingly the test is often merely referred to as the Lincoln engine test. The engine conditions of the Lincoln engine test are typical of the conditions encountered in present-day "stop-and-go" driving. On completion of the test the engine is disassembled and ratings are given for the extent of sludge formation, varnish, etc. at various locations in the engine. With respect to the data reported in Table XI, piston varnish and camshaft thrust piston varnish are rated on a scale of 0–10 with 10 being the highest rating attainable (i.e., no varnish). The ratings for total varnish and total adjusted sludge are on a scale of 0–50 with 50 being the highest rating attainable (i.e., no varnish or no sludge). Ring plugging or clogging is rated on a scale of 0–100%, 0 being the highest rating attainable (i.e., no clogging).

Details of the Sequence I, II, III and V test procedures are fully set forth in ASTM Special Technical Publication No. 315A.

The other full-scale test utilized to demonstrate the usefulness of the products of this invention, the Caterpillar CRC–L–1 engine test, modified to the extent of using a fuel having a 1% sulfur content (Supplement I), is a test designed to measure the efficacy of a lubricant under engine conditions of high temperature and high speed operation. Ratings are reported for lacquer demerits (piston cleanliness) on a scale of 0–100, 0 being a perfectly clean piston; percent ring groove filling on a scale of 0–100% (25% or lower is passing); land lacquer on a scale of 0–100; and a total rating, on a scale of 0–100, where 100 is the highest rating attainable. Details of the L–1 test procedure can be found in Caterpillar Diesel Lubricant Test Manual (1956).

For the data reported in the tables below the test lubricant consisted of a conventionally (solvent) refined Mid-Continent mineral oil, SAE 30, containing 0.95% zinc dialkyl dithiophosphate and a product of this invention at the concentration indicated.

TABLE X
Oldsmobile Engine Test Results

| Test additive (Example No.) | Additive concentration, percent by weight | Average varnish | Average sludge | Lifter, average | Engine, average |
|---|---|---|---|---|---|
| 88 | 1 | 9.8 | 9.9 | 7.2 | 5.9 |
| 92 | 1 | 9.8 | 9.9 | 8.4 | 7.0 |
| 94 | 1 | 9.7 | 9.9 | 8.0 | 7.1 |
| 94 | 2 | 9.8 | 9.9 | 9.7 | 9.3 |
| 102(b) | 1 | 9.7 | 9.8 | 5.8 | 4.6 |
| 104 | 2 | 9.9 | 9.8 | 9.5 | 8.7 |

TABLE XI
Lincoln Engine Test Results

| Test detergent (Example No.) | Detergent concentration, percent by weight | Average piston varnish | Camshaft thrust piston varnish | Total varnish | Total sludge | Ring plugging, percent |
|---|---|---|---|---|---|---|
| 92 | 1 | 7.2 | 7.0 | 31.4 | 32.4 | 30 |
| 94 | 2 | 8.5 | 9.0 | 39.7 | 45.9 | 1 |
| 102 | 1 | 7.5 | 7.6 | 33.7 | 35.8 | 22 |
| 102(b) | 1 | 6.4 | 7.0 | 29.3 | 31.6 | 28 |
| 103 | 1 | 7.5 | 7.5 | 32.1 | 35.0 | 34 |
| 104 | 1 | 6.7 | 7.4 | 33.1 | 37.8 | 13 |

TABLE XII
Caterpillar Engine Test Results (L–1 Supplement 1)

| Test additive (Example No.) | Additive concentration, percent by weight | Hours | Lacquer demerits | Percent ring groove filling | Land lacquer | Total rating |
|---|---|---|---|---|---|---|
| 92 | 2 | 120 | 0 | 2 | Nil | 99.6 |
|  |  | 240 | 0.3 | 5 | Nil | 98.0 |
|  |  | 480 | 12.7 | 25 | 2.5 | 81.6 |
| 102 | 2 | 135 | 7.3 | 1 | 1.6 | 90.2 |
| 102(b) | 2 | 120 | 0 | 0 | Nil | 99.9 |
|  |  | 240 | 0.6 | 0 | Nil | 99.0 |
|  |  | 480 | 9.02 | 2 | 2.1 | 87.4 |
| 104 | 2 | 240 | 0 | 7 | 0 | 99.2 |
|  |  | 480 | 17.3 | 13 | 1.0 | 76.2 |
|  | 3 | 480 | 0.0 | 17 | Nil | 98.1 |

By analyzing the data set forth in the above tables, it is evident that with the type of products within the scope of the present invention the presence of boron has no pronounced effect on the efficacy of such products as low temperature detergents [compare the Lincoln engine test data for the product of Example 102 which is boron free, with the data for the product of Example 102(b)]. On the other hand, it is also evident that the instant reaction products have good anti-rust properties (as measured in the Oldsmobile engine tests) and also that under conditions of high temperature and high speed operation, e.g., diesel engine conditions of which the L–1 is a direct measurement thereof, that the instant reaction products are good detergents and that the presence of boron significantly contributes to such high temperature detergency [compare the data in Table XII for the product of Example 102 which is boron free with the data for the product of Example 102(b)].

From the above, it is clear that the addition to lubricating oils of the various salts and reaction products of the present invention brings with it a clear improvement of various properties of said oils. Nevertheless the greater part of the commercial lubricating oils sold today are subject to a large number of uses, and it is, therefore, generally necessary to employ more than one type of additive in a finished lubricant composition. Thus, although the products of the present invention are effective detergents, possessing good anti-rust properties, it is frequently desirable or necessary to use such products in combination with other types of additives, such as metal-containing detergents and/or dispersants, corrosion inhibitors, anti-rust agents, oxidation inhibitors, extreme pressure agents, viscosity index improvers, pour-point depressors, anti-foaming agents, and the like.

A particularly useful combination of additives intended to be applied in motor lubricants is the combination of a salt of the present invention and a metal-containing derivative of phosphorus such as a metal phosphorodithioate, e.g., zinc dihexyl phosphorodithioate, the zinc salt of mixed alkyl phosphorodithioates where the alkyl groups are obtained, for example, from equal mixtures of isobutyl and n-amyl or isopropyl and 2-ethylhexyl alcohols and the metal salts of phosphorus sulfide-olefin polymer reaction products.

Lubricating oils which can be used as the base oils to which the new compounds of this invention are added are not limited as far as detergent effects are concerned, and, accordingly, can be lubricating oils which are of a naphthenic base, paraffinic base, and other hydrocarbon bases, as well as lubricating oils derived from coal products and synthetic oils, such as alkylene polymers, alkylene oxide polymers, dicarboxylic acid esters, alkylated benzenes, silicate esters, silicon polymers, and the like, are suitable.

The new compounds and reaction products can be used in such lubricating oils in amounts of from about 0.05% to about 25% by weight. Additive concentrates of 60–95% are also contemplated. It has been found, however, that in finished formulations, for most applications, amounts of from about 0.25% to about 10% by weight are sufficient. In addition, the new products of this invention can be used in fuel oils and in various light products, such as gasoline, wherein they also function as detergents or dispersants.

While this invention has been described with reference to various specific examples and embodiments, it is understood that the invention is not limited thereto and that it can be variously practiced within the scope of the following claims.

The embodiments of the invention in which an exclusive property or privilege is claimed are defined as follows:

1. A monoammonium salt of spiro[(3,5-dihydroxyboroxin)-1,1'-(3',5'-dihydroxyboroxin)] represented by the structure

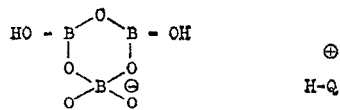

where Q is an imidazolidine represented by the structure

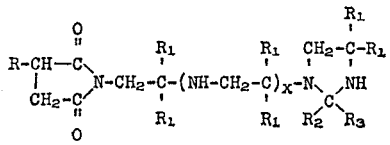

where R is a polyalkenyl having a molecular weight of from about 700 to about 2500; $R_1$ is selected from the group consisting of hydrogen and alkyl of 1 to 3 carbon atoms; $R_2$ and $R_3$ are each selected from the group consisting of hydrogen, alkyl, alkenyl and haloalkyl of 1 to 20 carbon atoms; and $x$ is a whole number from 0 to 3.

2. A compound of claim 1 where R is polybutenyl having an average molecular weight of from about 900 to about 1500, $x$ is 2, $R_1$ and $R_2$ are hydrogen and $R_3$ is propyl.

3. The 1-[8-(polybutenylsuccinimido)-3,6-diazooctyl]-2-propylimidazolidine monoammonium salt of spiro[(3,5-dihydroxyboroxin)-1',1'-(3',5'-dihydroxyboroxin)] where the polybutenyl group has an average molecular weight of about 1350.

4. The 1-[11-(polybutenylsuccinimido)-3,6,9-triazaundecyl]-2-propylimidazolidine monoammonium salt of spiro[(3,5-dihydroxyboroxin)-1',1'-(3',5'-dihydroxyboroxin)] where the polybutenyl group has an average molecular weight of about 1350.

5. A monoammonium salt of spiro[(3,5-dihydroxyboroxin)-1,1'-(3',5'-dihydroxyboroxin)] represented by the structure

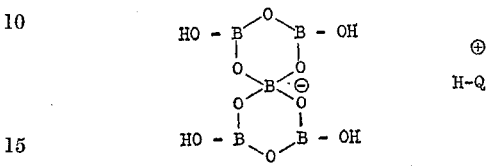

where Q is a bis-imidazolidine represented by the structure

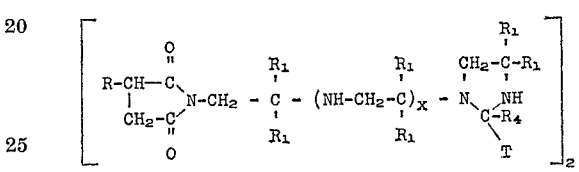

where R is a polyalkenyl having a molecular weight of from about 700 to about 2500; $R_1$ is selected from the group consisting of hydrogen and alkyl of 1 to 3 carbon atoms; $R_4$ is selected from the group consisting of hydrogen and alkyl of 1 to 20 carbon atoms; T is selected from the group consisting of alkylene of 1 to 20 and alkenylene of 2 to 20 carbon atoms; and $x$ is a whole number from 0 to 3.

6. A compound of claim 5 where R is polybutenyl having an average molecular weight of from about 900 to about 1500; $R_1$ and $R_4$ are hydrogen; $x$ is 3 and T is trimethylene.

References Cited

UNITED STATES PATENTS 3,087,936   4/1963   Le Suer _____ 260—326.3

HENRY R. JILES, Primary Examiner

U.S. Cl. X.R.

252—49.6; 260—240; 44—63, 71; 260—293.51, 293.72; 424—148, 185; 117—137; 260—243, 268, 247, 290, 309, 309.6, 306.7, 326.61, 567.6